US012647825B2

(12) United States Patent
Kim

(10) Patent No.: US 12,647,825 B2
(45) Date of Patent: Jun. 2, 2026

(54) DATA SEGMENTATION METHOD FOR ACCELERATING DATA PROCESSING, AND METHOD AND DEVICE FOR REPORTING RECEPTION STATE IN NEXT GENERATION MOBILE COMMUNICATION SYSTEM

(71) Applicant: Samsung Electronics Co., Ltd., Suwon-si (KR)

(72) Inventor: Donggun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 300 days.

(21) Appl. No.: 18/282,088

(22) PCT Filed: Mar. 17, 2022

(86) PCT No.: PCT/KR2022/003744
§ 371 (c)(1),
(2) Date: Sep. 14, 2023

(87) PCT Pub. No.: WO2022/203281
PCT Pub. Date: Sep. 29, 2022

(65) Prior Publication Data
US 2024/0306037 A1     Sep. 12, 2024

(30) Foreign Application Priority Data
Mar. 24, 2021     (KR) ........................ 10-2021-0038113

(51) Int. Cl.
| | |
|---|---|
| *H04W 28/06* | (2009.01) |
| *H04L 1/1607* | (2023.01) |
| *H04L 47/43* | (2022.01) |
| *H04L 69/324* | (2022.01) |

(52) U.S. Cl.
CPC ......... *H04W 28/065* (2013.01); *H04L 1/1642* (2013.01); *H04L 47/43* (2022.05); *H04L 69/324* (2013.01)

(58) Field of Classification Search
None
See application file for complete search history.

(56) References Cited

U.S. PATENT DOCUMENTS

| | | | |
|---|---|---|---|
| 10,257,748 B2 * | 4/2019 | Kim | ...................... H04W 72/20 |
| 10,999,890 B2 | 5/2021 | Quan et al. | |

(Continued)

FOREIGN PATENT DOCUMENTS

| | | |
|---|---|---|
| KR | 10-2020-0034738 A | 3/2020 |
| KR | 10-2208262 B1 | 1/2021 |

(Continued)

OTHER PUBLICATIONS

European Search Report dated Jun. 20, 2024, issued in European Application No. 22775983.4.

(Continued)

*Primary Examiner* — Eunsook Choi
(74) *Attorney, Agent, or Firm* — Jefferson IP Law, LLP

(57) ABSTRACT

The present disclosure relates to a 5G or 6G communication system for supporting a higher data transmission rate. Various embodiments of the present disclosure may provide a data segmentation method for accelerating data processing, and a method and a device for reporting a reception state in a next generation mobile communication system.

12 Claims, 22 Drawing Sheets

(56)                References Cited

U.S. PATENT DOCUMENTS

| | | | |
|---|---|---|---|
| 11,019,532 | B2 | 5/2021 | Kim |
| 11,419,001 | B2 * | 8/2022 | Parron .............. H04W 28/0278 |
| 11,516,142 | B2 | 11/2022 | Zheng et al. |
| 11,758,408 | B2 * | 9/2023 | Zhang .............. H04W 28/0268 |
| | | | 370/329 |
| 2009/0003283 | A1 | 1/2009 | Meylan |
| 2012/0140704 | A1 * | 6/2012 | Zhao ................. H04W 36/0064 |
| | | | 370/315 |
| 2019/0200262 | A1 * | 6/2019 | Kim ...................... H04W 72/20 |
| 2019/0372724 | A1 * | 12/2019 | Baek ................. H04W 28/0278 |
| 2020/0068438 | A1 * | 2/2020 | Kim .................... H04W 28/065 |
| 2020/0221528 | A1 | 7/2020 | Kim et al. |
| 2022/0264693 | A1 | 8/2022 | Kim et al. |
| 2024/0196262 | A1 * | 6/2024 | Teyeb ................... H04W 72/02 |

FOREIGN PATENT DOCUMENTS

| | | |
|---|---|---|
| KR | 10-2354589 B1 | 1/2022 |
| WO | 2020/062126 A1 | 4/2020 |
| WO | 2020/130578 A1 | 6/2020 |

OTHER PUBLICATIONS

3GPP TS 38.331 V16.3.1 (Jan. 2021) 3rd Generation Partnership Project; Technical Specification Group Radio Access Network; NR; Radio Resource Control (RRC) protocol specification (Release 16), Jan. 7, 2021.

3GPP TS 38.322 V16.2.0 (Dec. 2020) 3rd Generation Partnership Project; Technical Specification Group Radio Access Network; NR; Radio Link Control (RLC) protocol specification (Release 16), Jan. 6, 2021.

3GPP TS 38.304 V16.3.0 (Dec. 2020) 3rd Generation Partnership Project; Technical Specification Group Radio Access Network; NR; User Equipment (UE) procedures in Idle mode and RRC Inactive state (Release 16), Jan. 6, 2021.

3GPP TS 38.213 V16.4.0 (Dec. 2020) 3rd Generation Partnership Project; Technical Specification Group Radio Access Network; NR; Physical layer procedures for control (Release 16), Jan. 8, 2021.

3GPP TS 36.331 V16.3.0 (Dec. 2020) 3rd Generation Partnership Project; Technical Specification Group Radio Access Network; Evolved Universal Terrestrial Radio Access (E-UTRA); Radio Resource Control (RRC); Protocol specification (Release 16), Jan. 6, 2021.

3GPP TS 38.321 V16.3.0 (Dec. 2020) 3rd Generation Partnership Project; Technical Specification Group Radio Access Network; NR; Medium Access Control (MAC) protocol specification (Release 16), Jan. 6, 2021.

Korean Office Action with English translation dated Jan. 6, 2026; Korean Appln. No. 10-2021-0038113.

* cited by examiner

Figure 1L:
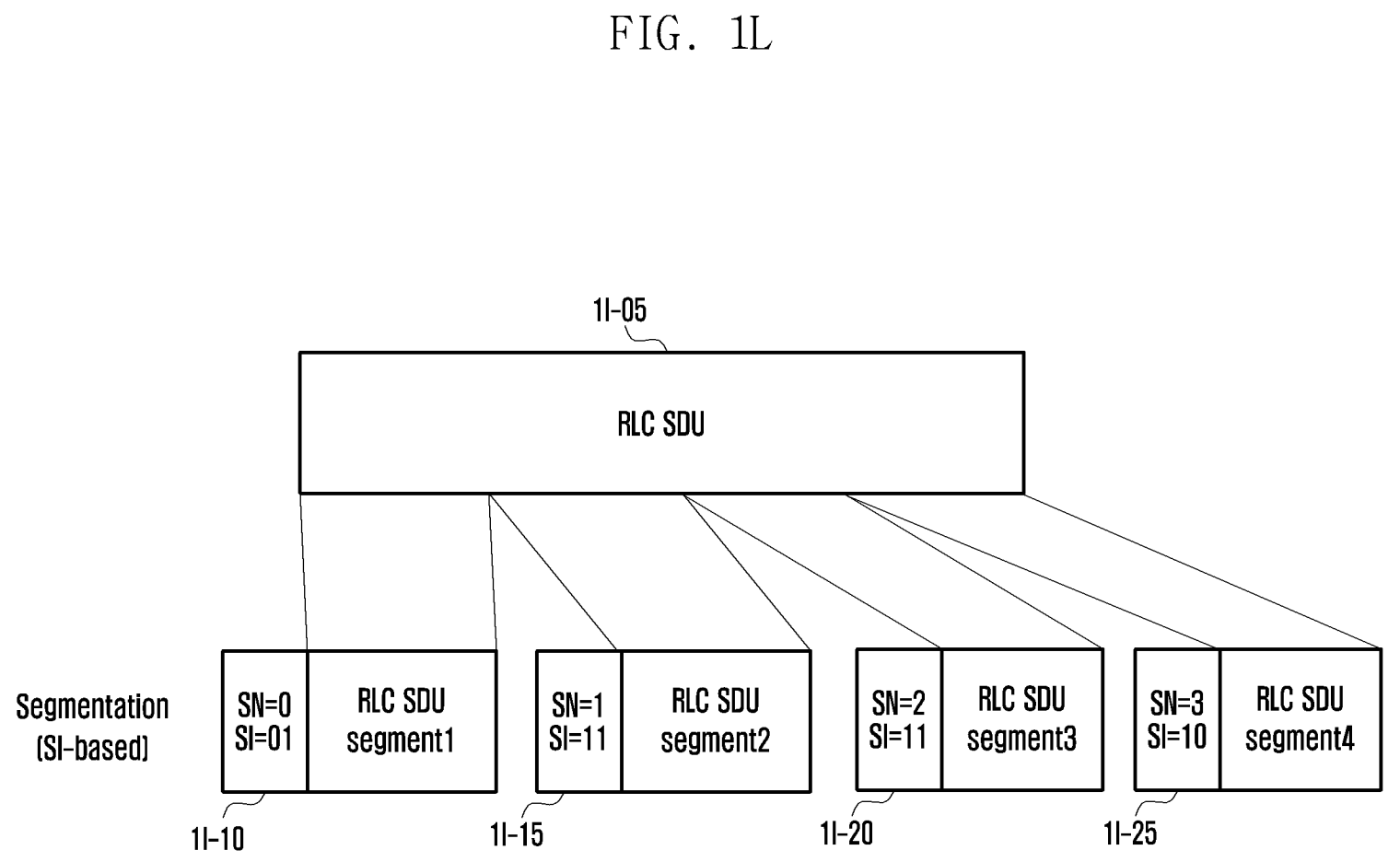

RLC SDU

| SN=0 SI=01 | RLC SDU segment1 |
| SN=1 SI=11 | RLC SDU segment2 |
| SN=2 SI=11 | RLC SDU segment3 |
| SN=3 SI=10 | RLC SDU segment4 |

1I-10

1I-15

1I-20

1I-25

Segmentation (SI-based)

FIG. 1M

FIG. 10
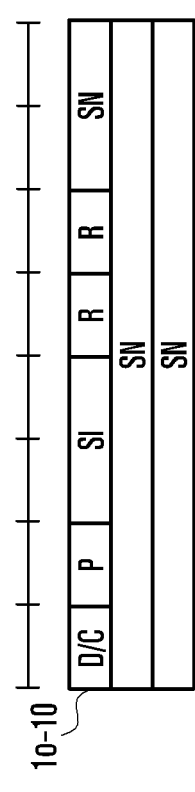
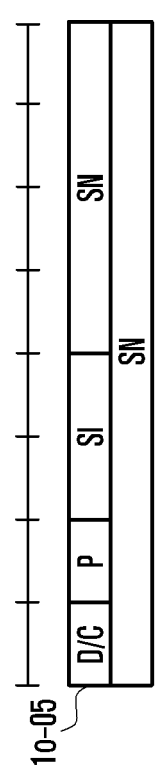

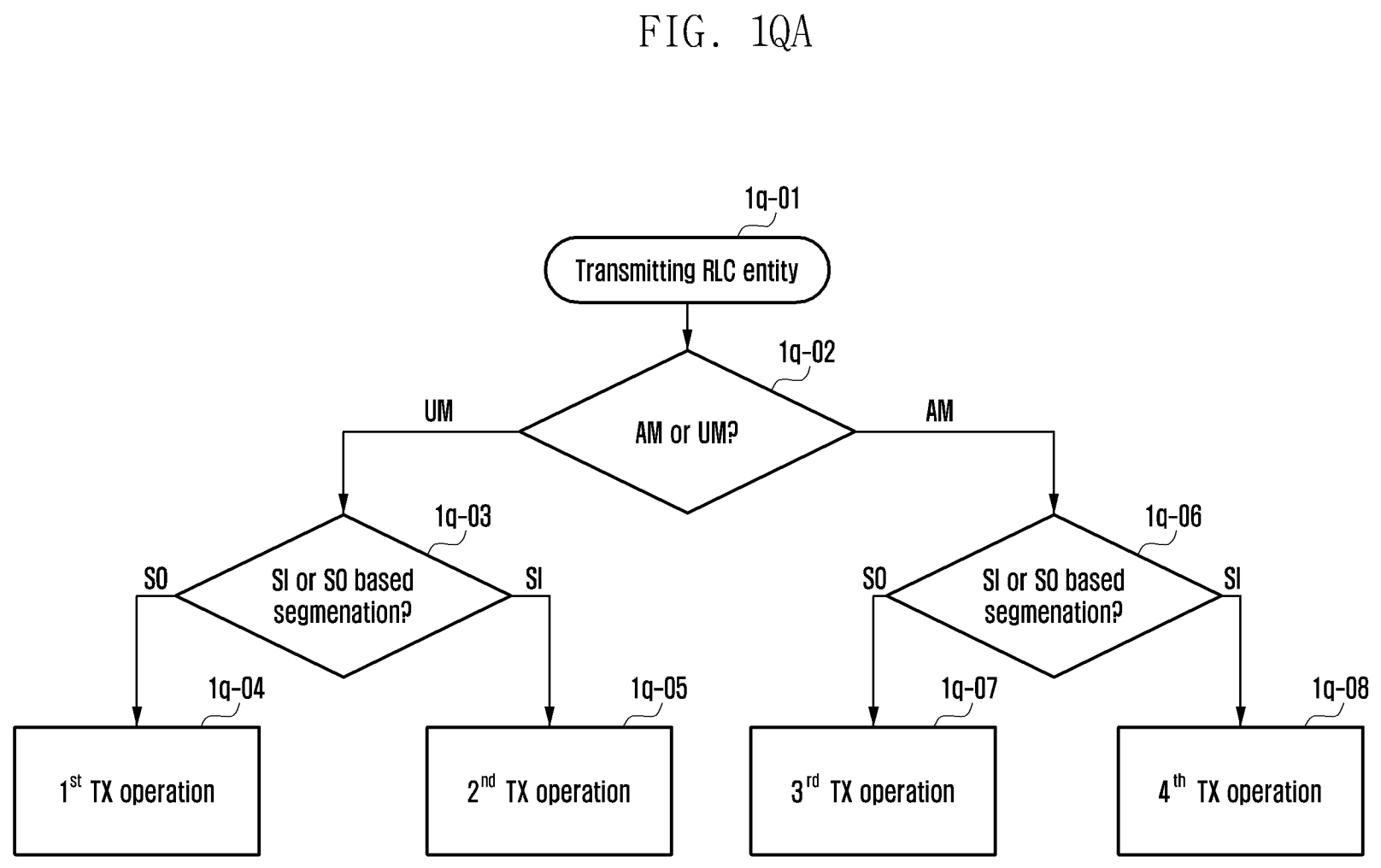

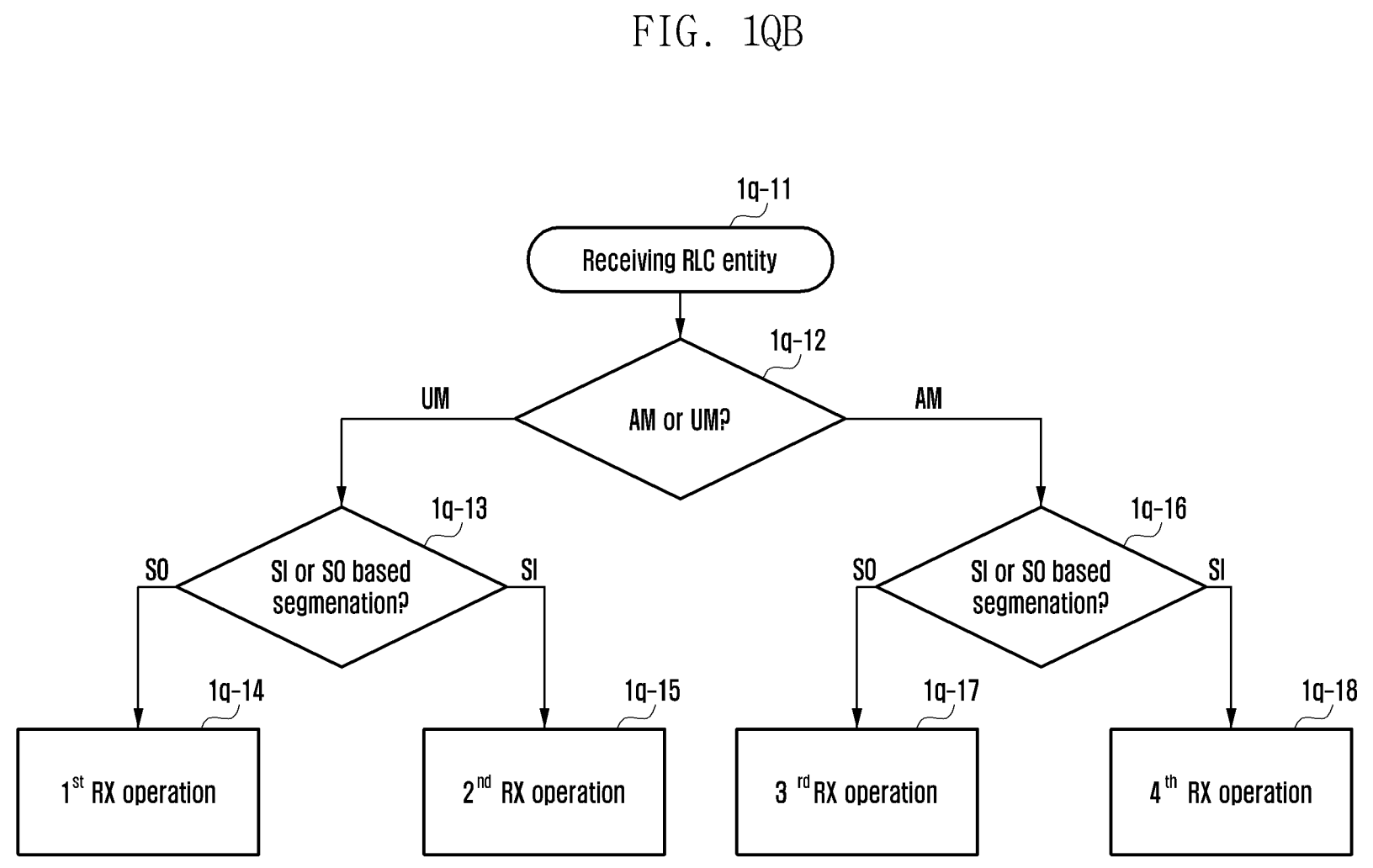

DATA SEGMENTATION METHOD FOR ACCELERATING DATA PROCESSING, AND METHOD AND DEVICE FOR REPORTING RECEPTION STATE IN NEXT GENERATION MOBILE COMMUNICATION SYSTEM

TECHNICAL FIELD

The disclosure relates to an effective reception state reporting method and device, and methods of using a PDCP header, an RLC header, or a MAC header having a fixed size for each piece of data when a higher data transfer rate is supported, so as to improve procedures having a high complexity of data processing or requiring a large time for data processing in a next generation mobile communication system.

BACKGROUND ART 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G.

In the initial stage of 5G mobile communication technologies, in order to support services and to satisfy performance requirements in connection with enhanced Mobile BroadBand, (eMBB), Ultra Reliable & Low Latency Communications (URLLC), and massive Machine-Type Communications (mMTC), there has been ongoing standardization regarding beamforming and massive MIMO for alleviating radio-wave path loss and increasing radio-wave transmission distances in mmWave, numerology (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large-capacity data transmission and a polar code for highly reliable transmission of control information, L2 pre-processing, and network slicing for providing a dedicated network customized to a specific service.

Currently, there is ongoing discussion regarding improvement and performance enhancement of initial 5G mobile communication technologies in view of services to be supported by 5G mobile communication technologies, and there has been physical layer standardization regarding technologies such as V2X for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for securing coverage in an area in which communication with terrestrial networks is impossible, and positioning.

Moreover, there has been ongoing standardization in wireless interface architecture/protocol fields regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service fields regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

If such 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting augmented reality (AR), virtual reality (VR), mixed reality (MR), and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for securing coverage in terahertz bands of 6G mobile communication technologies, Full Dimensional MIMO (FD-MIMO), multi-antenna transmission technologies such as array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

DISCLOSURE OF INVENTION

Technical Problem

In a next generation mobile communication system, support of a higher data transfer rate is required, and thus a large data processing time may be consumed. Therefore, in order to reduce data processing time, a method which improves a header structure suitable for a hardware accelerator or a procedure such as an autonomous repeat request (ARQ) operation, and is parallelly processible may be needed.

The technical subjects pursued in the disclosure may not be limited to the above mentioned technical subjects, and other technical subjects which are not mentioned may be clearly understood, through the following descriptions, by those skilled in the art to which the disclosure pertains.

Solution to Problem

In order to solve the problem described above, a method performed by a transmission device of a wireless communication system according to an embodiment of the disclosure may include identifying whether a size of a radio link control (RLC) service data unit (SDU) is larger than that of an allocated resource, in case that the size of the RLC SDU is larger than that of the allocated resource, segmenting the RLC SDU into at least two segments, generating a header of each of the at least two segments, the header including information for identifying whether the RLC SDU has been segmented and sequence number information for identifying an order of each of the at least two segments, and transmitting data including the headers and the at least two segments to a reception device.

In addition, identification information for identifying whether the RLC SDU has been segmented may be a segmentation information (SI) field, and the SI field may indicate whether the RLC SDU has not been segmented, whether a segment is a first segment of the RLC SDU, whether a segment is a last segment of the RLC SDU, or whether a segment is a segment other than the first and last segments of the RLC SDU.

In addition, the sequence number information for identifying the order of the each of the at least two segments may have a sequence number in ascending order according to a sequence of the at least two segments.

In addition, the method may further include receiving, from the reception device, information indicating whether the transmission device is able to segment the RLC SDU into the at least two segments and transmit the at least two segments using the sequence number information for identifying the order of the each of the at least two segments.

In order to solve the problem described above, a method performed by a reception device of a wireless communication system according to an embodiment of the disclosure may include receiving a message including a radio resource control (RLC) protocol data unit (PDU) from a transmission device, identifying, from the RLC PDU, a header including information for identifying whether an RLC service data unit (SDU) has been segmented into at least two segments and sequence number information for identifying an order of each of the at least two segments, in case that the RLC SDU is segmented and transmitted, identifying the at least two segments, based on the sequence number information of the at least two segments, and reassembling the at least two segments to the RLC SDU according to orders, and transmitting the reassembled RLC SDU to a higher layer device.

In addition, the information for identifying whether the RLC SDU has been segmented may be a segmentation information (SI) field, and the SI field may indicate whether the RLC SDU has not been segmented, whether a segment is a first segment of the RLC SDU, whether a segment is a last segment of the RLC SDU, or whether a segment is a segment other than the first and last segments of the RLC SDU.

In addition, the sequence number information for identifying the order of the each of the at least two segments may have a sequence number in ascending order according to a sequence of the at least two segments.

In addition, the method may further include transmitting, to the transmission device, information indicating whether the transmission device is able to segment the RLC SDU into the at least two segments and transmit the at least two segments using the sequence number information for identifying the order of the each of the at least two segments.

In order to solve the problem described above, a transmission device of a wireless communication system according to an embodiment of the disclosure may include a transceiver, and a controller coupled with the transceiver and configured to identify whether a size of a radio link control (RLC) service data unit (SDU) is larger than that of an allocated resource, in case that the size of the RLC SDU is larger than that of the allocated resource, segment the RLC SDU into at least two segments, generate a header of each of the at least two segments, the header including information for identifying whether the RLC SDU has been segmented and sequence number information for identifying an order of the each of the at least two segments, and transmit data including the headers and the at least two segments to a reception device.

In addition, in order to solve the problem described above, a reception device of a wireless communication system according to an embodiment of the disclosure may include a transceiver, and a controller coupled with the transceiver and configured to receive a message including a radio resource control (RLC) protocol data unit (PDU) from a transmission device, identify, from the RLC PDU, a header including information for identifying whether an RLC service data unit (SDU) has been segmented into at least two segments and sequence number information for identifying an order of each of the at least two segments, in case that the RLC SDU is segmented and transmitted, identify the at least two segments, based on the sequence number information of the at least two segments, reassemble the at least two segments to the RLC SDU according to the orders, and transmit the reassembled RLC SDU to a higher layer device.

Advantageous Effects of Invention

In order to support a high data transfer rate at a high data processing speed in a next generation mobile communication system, the disclosure may propose a header structure suitable for a hardware accelerator to improve the performance of the hardware accelerator, and propose a simple reception state reporting method for processing of an autonomous repeat request (ARQ) operation, so that methods by which the efficiency of a data processing procedure is maximized and data processing is accelerated may be proposed.

Advantageous effects obtainable from the disclosure may not be limited to the above mentioned effects, and other effects which are not mentioned may be clearly understood, through the following descriptions, by those skilled in the art to which the disclosure pertains.

BRIEF DESCRIPTION OF DRAWINGS

FIG. 1GB is a diagram illustrating an operation in which, in a next generation mobile communication system according to an embodiment of the disclosure, each protocol layer device of a bearer processes data received from a higher layer device and transmits the processed data, or receives data from a lower layer device, processes the data, and transfers the processed data to a higher layer device;

FIG. 1GC is a diagram illustrating an operation in which, in a next generation mobile communication system according to an embodiment of the disclosure, each protocol layer device of a bearer processes data received from a higher layer device and transmits the processed data, or receives data from a lower layer device, processes the data, and transfers the processed data to a higher layer device;

FIG. 1H is a diagram illustrating a SO-based segmentation operation available in an RLC layer RLC AM mode or an RLC UM mode according to an embodiment of the disclosure;

FIG. 1I is a diagram illustrating a data processing operation employing a SO-based segmentation operation of an RLC AM mode or an RLC UM mode according to an embodiment of the disclosure;

FIG. 1L is a diagram illustrating a SI field-based segmentation method (segmentation) proposed for an RLC UM mode or an RLC AM mode according to an embodiment of the disclosure;

FIG. 1M is a diagram illustrating a data processing operation employing a SI-based segmentation method of an RLC UM mode or an RLC AM mode according to an embodiment of the disclosure;

FIG. 1O is a diagram illustrating an example of RLC headers available in an RLC layer device when a SI field-based data segmentation method according to an embodiment of the disclosure is used;

FIG. 1QA is a diagram illustrating an operation of an RLC layer device of a terminal according to an embodiment of the disclosure;

FIG. 1QB is a diagram illustrating an operation of an RLC layer device of a terminal according to an embodiment of the disclosure;

FIG. 1S is a diagram illustrating a block configuration of a base station in a wireless communication system to which an embodiment of the disclosure is applicable.

MODE FOR THE INVENTION

Figure 1A:
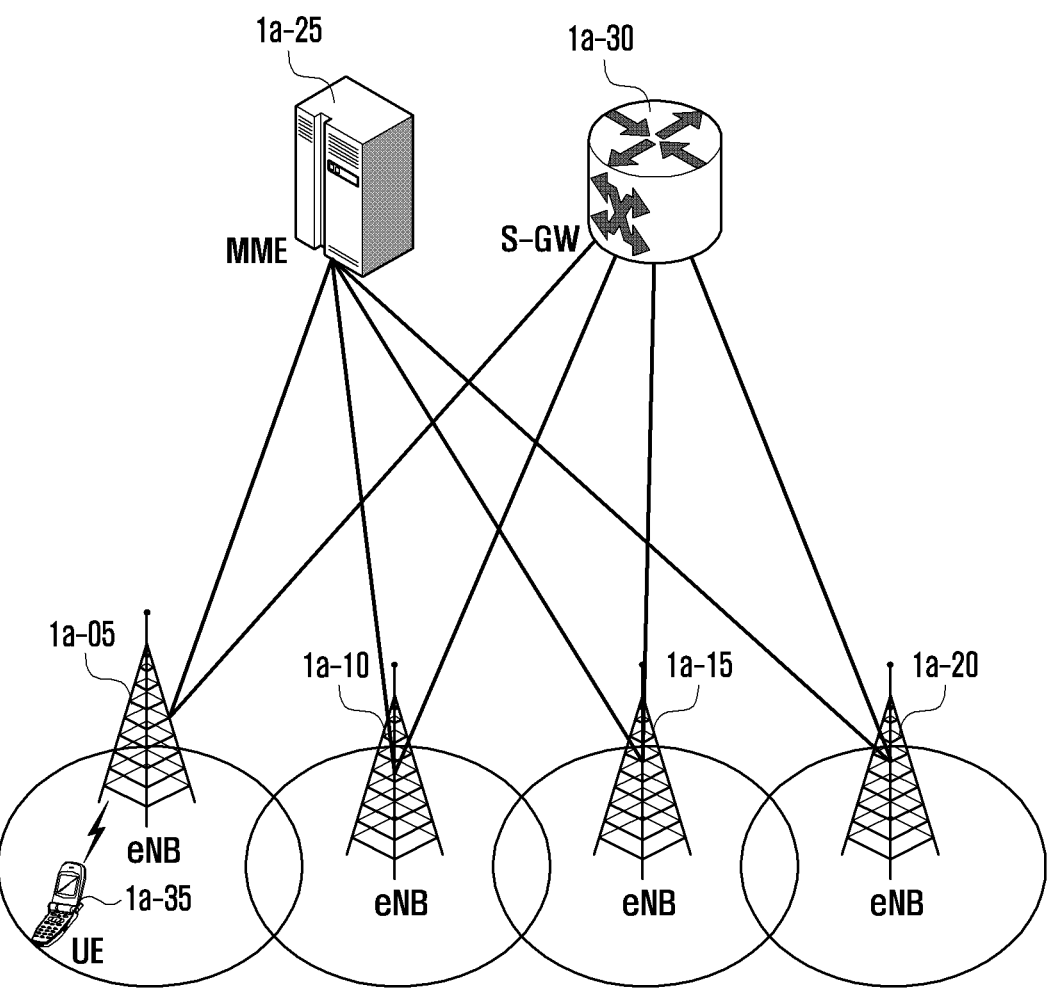
FIG. 1A is a diagram illustrating a structure of an LTE system according to an embodiment of the disclosure.

Hereinafter, the operation principle of the disclosure will be described in detail with reference to the accompanying drawings. In the following description of the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In describing the disclosure below, a detailed description of known functions or configurations incorporated herein will be omitted when it is determined that the description may make the subject matter of the disclosure unnecessarily unclear.

In the following description, terms for identifying access nodes, terms referring to network entities, terms referring to messages, terms referring to interfaces between network entities, terms referring to various identification information, and the like are illustratively used for the sake of descriptive convenience. Therefore, the disclosure is not limited by the terms as used below, and other terms referring to subjects having equivalent technical meanings may be used.

In the following description, the disclosure will be described using terms and names defined in the 3rd generation partnership project long term evolution (3GPP LTE) standards for the sake of descriptive convenience. However, the disclosure is not limited by these terms and names, and may be applied in the same way to systems that conform other standards. In the disclosure, the term "eNB" may be interchangeably used with the term "gNB". That is, a base station described as "eNB" may indicate "gNB".

In the disclosure, a bearer may mean both an SRB and a DRB, an SRB denotes a signaling radio bearer, and a DRB denotes a data radio bearer. Such an SRB is used mainly to transmit and receive an RRC message of an RRC layer device, and a DRB may be used mainly to transmit and receive pieces of user layer data. A UM DRB indicates a DRB using an RLC layer device operating in an unacknowledged mode (UM) mode, and an AM DRB may indicate a DRB using an RLC layer device operating in an acknowledged mode (AM) mode.

The disclosure is to propose a header structure (e.g., a medium access control (MAC) header, a radio link control (RLC) header, or a packet data convergence protocol (PDCP) header) suitable for a hardware accelerator so as to accelerate a data processing speed of a base station or a terminal in a next generation mobile communication system. In addition, the disclosure may propose a new data segmentation method (a segmentation information (SI) field-based data segmentation method) for an RLC layer device as a method for applying the proposed structure. In addition, the disclosure may also propose a bitmap-based RLC state report configuration method that is efficient for an automatic repeat request (ARQ) procedure.

A header structure proposed in the disclosure may be transmitted by a base station to a terminal through an RRC message (e.g., this may be an RRCReconfiguration message) including configuration information (or indicator) so that the terminal uses the header structure for each layer device (e.g., PDCP layer device, RLC layer device, or MAC layer device) or each bearer. Therefore, the header structure proposed in the disclosure may be configured to be used by the terminal for each layer device or each bearer. In addition, a SI field-based data segmentation method or a bitmap-based RLC state report configuration method proposed in the disclosure may be transmitted by a base station to a terminal through an RRC message (e.g., an RRCReconfiguration message) including configuration information (or indicator) so that the terminal uses the header structure for each layer device (e.g., PDCP layer device, RLC layer device, or MAC layer device) or each bearer, whereby, the SI field-based data segmentation method or the bitmap-based RLC state report configuration method may be configured to be used by the terminal for each layer device or each bearer.

Configuration information, included in the RRC message, indicating configuration of a header, an SI field-based data segmentation method, or a bitmap-based RLC state report proposed in the disclosure is allowed to be configured only when each layer device is established, when a bearer is established (or configured), in a case of handover, or in a case of bearer type change. Therefore, using different header structures, different data segmentation methods, or different RLC state reports interchangeably or mixedly may be prevented.

In the above description, if a SI field-based data segmentation method is not configured or if a SI field-based data segmentation method is not used, the terminal may use a segment offset (SO) field-based data segmentation method. In addition, in the above description, if a bitmap-based RLC state report configuration method is not configured or if a bitmap-based RLC state report configuration method is not used, the terminal may use an RLC sequence number-based RLC state report configuration method. As another method, the RRC message (e.g., RRCReconfiguration message) may configure a data segmentation method not to be performed, to be deactivated, to be activated, or to be performed for each layer device (e.g., RLC layer device configuration information) or each bearer.

For example, when the RRC message (e.g., RRCReconfiguration message) configures a data segmentation method not to be used (or to be deactivated), the terminal may not use the data segmentation method (SI field-based data segmentation method or SO field-based data segmentation method) for the RLC layer device. If data segmentation is needed, the terminal does not perform data segmentation in the RLC layer device, and may transmit, to a lower layer device, a data size smaller than that of a transmission resource requested from the lower layer device. When the RRC message (e.g., RRCReconfiguration message) does not configure a data segmentation method not to be used (or the message configures the data segmentation method to be used, or does not include an indicator indicating not to use the data segmentation method), the terminal may use an SO field-based data segmentation method (or may use an RLC header format corresponding to the SO field-based data segmentation method). In addition, when an SI field-based data segmentation method is configured, the terminal may use the SI field-based data segmentation method (or may use an RLC header format corresponding to the SI field-based data segmentation method).

In addition, an SI-based data segmentation method, bitmap-based RLC state reporting, or activation (or deactivation) of a data segmentation method, which is proposed above in the disclosure, is limited to be configurable only for a particular RLC mode (e.g., RLC unacknowledged mode (UM) mode or RLC acknowledged mode (AM) mode).

Therefore, the number of cases of various implementation methods is reduced, and thus complexity of terminal implementation may be reduced.

In the above description, the terminal may be able or unable to support, according to terminal capability, a header structure, an SI-based data segmentation method, a bitmap-based RLC state report configuration method, or whether activation (or deactivation) of a data segmentation method is possible, which is proposed in the disclosure. The base station may request the capability of the terminal through an RRC message (UECapabilityEnquiry), and the terminal may indicate a terminal capability (i.e., a function supported by the terminal) supported by the terminal in an RRC message (UECapabilitylnformation) in response to the request, and report same to the base station. The base station may identify the terminal capability reporting, and may configure, for the terminal, functions supported by the terminal (e.g., a header format (structure), an SI-based data segmentation method, bitmap-based RLC state reporting, or activation (deactivation) of a data segmentation method, which is proposed in the disclosure).

FIG. 1A is a diagram illustrating a structure of an LTE system according to an embodiment of the disclosure.

Referring to FIG. 1A, a wireless access network of an LTE system may include next generation base stations (evolved node Bs, hereinafter, ENBs, Node Bs, or base stations) 1a-05, 1a-10, 1a-15, and 1a-20, a mobility management entity (MME) 1a-25, and a serving gateway (S-GW) 1a-30. A user equipment (hereinafter, a UE or a terminal) 1a-35 may access an external network via the ENBs 1a-05 to 1a-20 and the S-GW 1a-30.

In FIG. 1A, the ENBs 1a-05 to 1a-20 may correspond to a conventional node B of a UMTS system. The ENB may be connected to the UE 1a-35 through a wireless channel and may perform more complex roles compared to a conventional node B. In an LTE system, all user traffic including real-time services such as a voice over IP (VoIP), which is performed through an Internet protocol, is serviced through a shared channel. Therefore, a device configured to collect pieces of state information including a buffer state, an available transmission power state, and a channel state of UEs and perform scheduling is required, and the ENBs 1a-05 to 1a-20 may serve as the device. A single ENB may commonly control multiple cells. For example, the LTE system may use, as a wireless access technology, for example, orthogonal frequency division multiplexing (hereinafter, may be referred to as OFDM) in a bandwidth of 20 MHz in order to implement a transmission speed of 100 Mbps. Furthermore, the LTE system may apply an adaptive modulation & coding (hereinafter, referred to as AMC) scheme of determining a modulation scheme and a channel coding rate according to a channel state of a terminal. The S-GW 1a-30 is a device providing a data bearer, and may generate or remove a data bearer according to control of the MME 1a-25. The MME is a device that performs various control functions as well as a mobility management function for a terminal, and may be connected to a plurality of base stations.

Figure 1B:
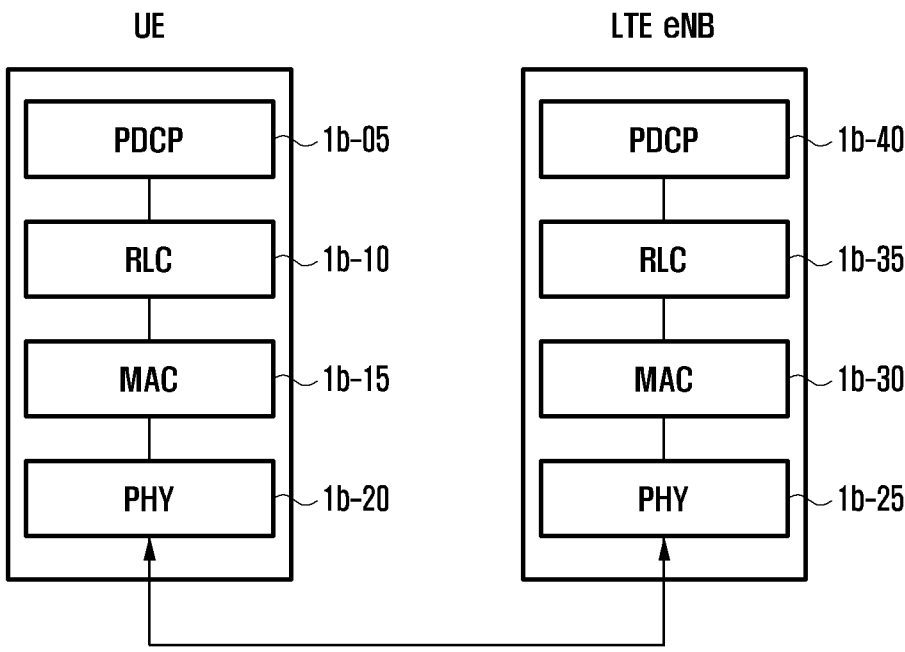
FIG. 1B is a diagram illustrating a wireless protocol structure of an LTE system according to an embodiment of the disclosure.

FIG. 1B is a diagram illustrating a wireless protocol structure of an LTE system according to an embodiment of the disclosure.

Referring to FIG. 1B, a wireless protocol of an LTE system includes a packet data convergence protocol (PDCP) 1b-05 or 1b-40, a radio link control (RLC) 1b-10 or 1b-35, and a medium access control (MAC) 1b-15 or 1b-30 in each of a terminal and an ENB. The packet data convergence protocol (PDCP) 1b-05 or 1b-40 may perform an operation such as IP header compression/reconstruction. Main functions of the PDCP 1b-05 or 1b-40 may be summarized as follows.

Header compression and decompression (ROHC only)

Transfer of user data

In-sequence delivery (In-sequence delivery of upper layer PDUs at PDCP re-establishment procedure for RLC AM)

Reordering (For split bearers in DC (only support for RLC AM): PDCP PDU routing for transmission and PDCP PDU reordering for reception)

Duplicate detection (Duplicate detection of lower layer SDUs at PDCP re-establishment procedure for RLC AM)

Retransmission (Retransmission of PDCP SDUs at handover and, for split bearers in DC, of PDCP PDUs at PDCP data-recovery procedure, for RLC AM)

Ciphering and deciphering

Timer-based SDU discard (Timer-based SDU discard in uplink)

The radio link control (hereinafter, may be referred to as RLC) 1b-10 or 1b-35 may reconfigure a PDCP protocol data unit (PDU) or an RLC service data unit (SDU) to have a proper size to perform an ARQ operation. Main functions of the RLC 1b-10 or 1b-35 may be summarized as follows.

Data transfer (Transfer of upper layer PDUs)

ARQ (Error Correction through ARQ (only for AM data transfer))

Concatenation, segmentation and reassembly (Concatenation, segmentation and reassembly of RLC SDUs (only for UM and AM data transfer))

Re-segmentation (Re-segmentation of RLC data PDUs (only for AM data transfer))

Reordering (Reordering of RLC data PDUs (only for UM and AM data transfer))

Duplicate detection (only for UM and AM data transfer)

Error detection (Protocol error detection (only for AM data transfer))

RLC SDU discard (only for UM and AM data transfer)

RLC re-establishment

The MAC 1b-15 or 1b-30 is connected to several RLC layer devices configured in a single terminal, and perform an operation of multiplexing RLC PDUs to a MAC PDU, and demultiplexing a MAC PDU to RLC PDUs. Main functions of the MAC 1b-15 or 1b-30 are summarized as follows.

Mapping (Mapping between logical channels and transport channels)

Multiplexing and demultiplexing (Multiplexing/demultiplexing of MAC SDUs belonging to one or different logical channels into/from transport blocks (TB) delivered to/from the physical layer on transport channels)

Scheduling information reporting

HARQ (Error correction through HARQ)

Priority handling between logical channels (Priority handling between logical channels of one UE)

Priority handling between UEs (Priority handling between UEs by means of dynamic scheduling)

MBMS service identification

Transport format selection

Padding

A physical layer 1b-20 or 1b-25 may perform channel coding and modulation of higher layer data to make the data into OFDM symbols and transmit the OFDM symbols through a wireless channel, or may perform demodulation and channel decoding of OFDM symbols received through a wireless channel, and then transfer the OFDM symbols to a higher layer.

Figure 1C:
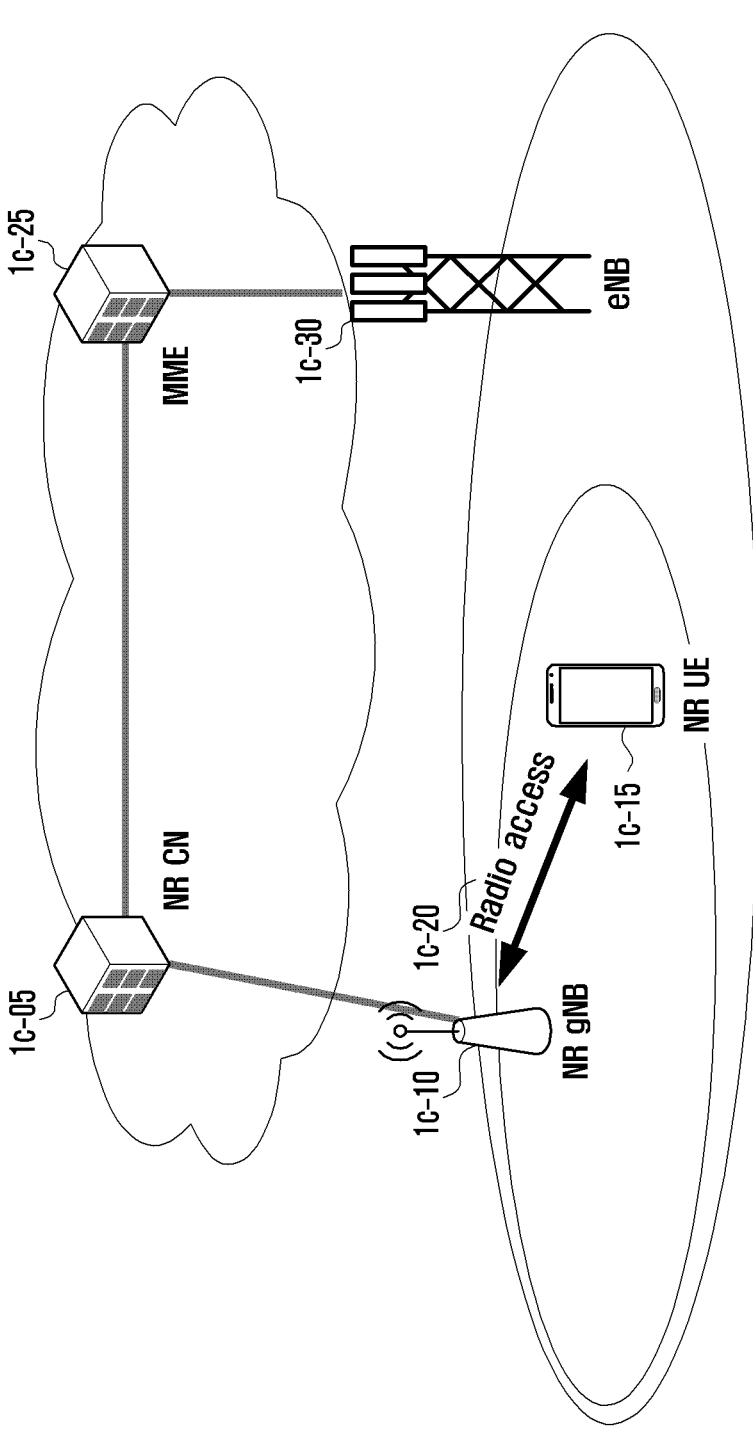
FIG. 1C is a diagram illustrating a structure of a next generation mobile communication system according to an embodiment of the disclosure.

FIG. 1C is a diagram illustrating a structure of a next generation mobile communication system according to an embodiment of the disclosure.

Referring to FIG. 1C, a wireless access network of a next generation mobile communication system (hereinafter, NR or 5G) includes a next generation base station (new radio node B, hereinafter, NR gNB or NR base station) 1c-10, and a new radio core network (NR CN) 1c-05. A user terminal (new radio user equipment, hereinafter, NR UE or terminal) 1c-15 may access an external network via the NR gNB 1c-10 and the NR CN 1c-05.

In FIG. 1c, the NR gNB 1c-10 corresponds to an evolved node B (eNB) of a conventional LTE system. The NR gNB 1c-10 is connected to the NR UE 1c-15 through a wireless channel and may provide an outstanding service compared to a conventional node B. In a next generation mobile communication system, all user traffic is serviced thorough a shared channel. Therefore, a device which collects pieces of state information including a buffer state, an available transmission power state, and a channel state of UEs 1c-15 and performs scheduling is required, and the NR NB 1c-10 may serve as the device. A single NR gNB 1c-10 may normally control multiple cells. In order to implement ultra-high-speed data transfer compared to the current LTE, this system may provide a bandwidth wider than the conventional maximum bandwidth, may employ an orthogonal frequency division multiplexing (hereinafter, may be referred to as OFDM) as a wireless access technology, and may additionally integrate a beamforming technology therewith. Furthermore, the system may apply an adaptive modulation & coding (hereinafter, may be referred to as AMC) scheme of determining a modulation scheme and a channel coding rate according to a channel state of the terminal 1c-15. The NR CN 1c-05 may perform functions such as mobility support, bearer configuration, and QoS configuration. The NR CN 1c-05 is a device which is responsible for various control functions as well as a mobility management function for a terminal, and is connected to a plurality of base stations 1c-10. In addition, the next generation mobile communication system may be linked to a conventional LTE system, and the NR CN 1c-05 is connected to an MME 1c-25 via a network interface. The MME 1c-25 is connected to an eNB 1c-30 that is a conventional base station.

Figure 1D:
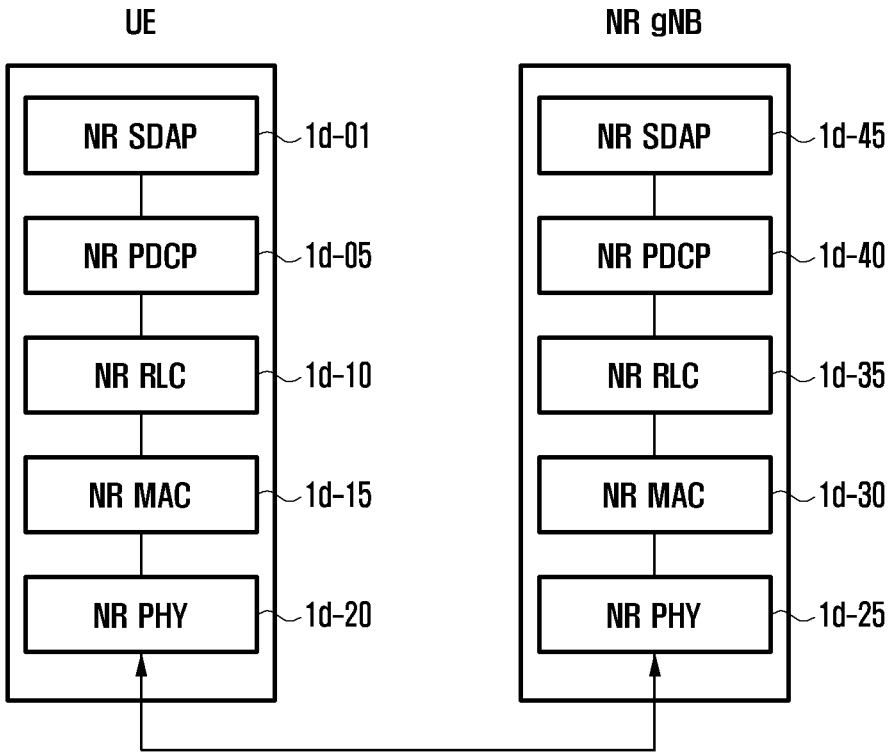
FIG. 1D is a diagram illustrating a wireless protocol structure of a next generation mobile communication system according to an embodiment of the disclosure.

FIG. 1D is a diagram illustrating a wireless protocol structure of a next generation mobile communication system according to an embodiment of the disclosure.

Referring to FIG. 1D, a wireless protocol of a next generation mobile communication system includes an NR SDAP 1d-01 or 1d-45, an NR PDCP 1d-05 or 1d-40, an NR RLC 1d-10 or 1d-35, and an NR MAC 1d-15 or 1d-30 in each of a terminal and an NR base station.

Main functions of the NR SDAP 1d-01 or 1d-45 may include a part of functions below.

Transfer of user data (transfer of user plane data)

Mapping between a QoS flow and a data bearer for uplink and downlink (mapping between a QoS flow and a DRB for both DL and UL)

Marking a QoS flow ID in uplink and downlink (marking QoS flow ID in both DL and UL packets)

Mapping a reflective QoS flow to a data bearer with respect to UL SDAP PDUs (reflective QoS flow to DRB mapping for the UL SDAP PDUs)

Whether to use a header of the SDAP layer device, or whether to use a function of the SDAP layer device may be configured for the terminal with respect to the SDAP layer device through an RRC message for each PDCP layer device, each bearer, or each logical channel. Furthermore, in a case where an SDAP header is configured, an NAS QoS reflective configuration one-bit indicator (NAS reflective QoS) and an As QoS reflective configuration one-bit indicator (As reflective QoS) of the SDAP header may indicate the terminal to update or reconfigure mapping information relating to a QoS flow and a data bearer for uplink and downlink. The SDAP header may include QoS flow ID information indicating a QoS. The QoS information may be used as data processing priority, scheduling information, etc. for smoothly supporting a service.

Main functions of the NR PDCP 1d-05 or 1d-40 may include a part of functions below.

Header compression and decompression (ROHC only)

Transfer of user data

In-sequence delivery (In-sequence delivery of upper layer PDUs)

Out-of-sequence delivery (Out-of-sequence delivery of upper layer PDUs)

Reordering (PDCP PDU reordering for reception)

Duplicate detection (Duplicate detection of lower layer SDUs)

Retransmission (Retransmission of PDCP SDUs)

Ciphering and deciphering

Timer-based SDU discard (Timer-based SDU discard in uplink)

The reordering of the NR PDCP device denotes a function of reordering PDCP PDUs received from a lower layer in an order based on PDCP sequence numbers (SNs), and may include a function of transferring data to a higher layer according to a rearranged order, may include a function of directly transferring data without considering an order, may include a function of rearranging an order to record lost PDCP PDUs, may include a function of reporting the state of lost PDCP PDUs to a transmission side, or may include a function of requesting retransmission of lost PDCP PDUs.

Main functions of the NR RLC 1d-10 or 1d-35 may include a part of functions below.

Data transfer (Transfer of upper layer PDUs)

In-sequence delivery (In-sequence delivery of upper layer PDUs)

Out-of-sequence delivery (Out-of-sequence delivery of upper layer PDUs)

ARQ (Error correction through ARQ)

Concatenation, segmentation and reassembly (Concatenation, segmentation and reassembly of RLC SDUs)

Re-segmentation (Re-segmentation of RLC data PDUs)

Reordering (Reordering of RLC data PDUs)

Duplicate detection

Error detection (Protocol error detection)

RLC SDU discard

RLC re-establishment

The in-sequence delivery of the NR RLC device may indicate a function of transferring RLC SDUs received from a lower layer to a higher layer in sequence. Furthermore, the in-sequence delivery may include a function of, if one original RLC SDU is divided into several RLC SDUs and then the RLC SDUs are received, reassembling the several RLC SDUs and transferring the reassembled RLC SDUs, may include a function of rearranging received RLC PDUs with reference to RLC sequence numbers (SNs) or PDCP sequence numbers (SNs), may include a function of rearranging an order to record lost RLC PDUs, may include a function of reporting the state of lost RLC PDUs to a transmission side, may include a function of requesting retransmission of lost RLC PDUs, may include a function of, if there is a lost RLC SDU, sequentially transferring only RLC SDUs before the lost RLC SDU to a higher layer, may include a function of, although there is a lost RLC SDU, if a predetermined timer is expired, sequentially transferring, to a higher layer, all the RLC SDUs received before the timer is started, or may include a function of, although there is a lost RLC SDU, if a predetermined timer is expired, sequentially transferring all the RLC SDUs received up to the current, to a higher layer. In addition, the NR RLC device may process RLC PDUs in a reception order (an order in which the RLC PDUs have arrived, regardless of an order based on sequence numbers) and then transfer the processed RLC PDUs to a PDCP device regardless of an order (out-of-sequence delivery). In a case of segments, the NR RLC device may receive segments stored in a buffer or to be received in the future, reconfigure the segments to be one whole RLC PDU, then process the RLC PDU, and transfer the processed RLC PDU to a PDCP device. The NR RLC layer may not include a concatenation function, and the function may be performed in an NR MAC layer or replaced with a multiplexing function of an NR MAC layer.

The out-of-sequence delivery of the NR RLC device may indicate a function of immediately transferring RLC SDUs received from a lower layer, to a higher layer regardless of the order thereof. Furthermore, the out-of-sequence delivery may include a function of, if one original RLC SDU is divided into several RLC SDUs and then the RLC SDUs are received, reassembling the several RLC SDUs and transferring the reassembled RLC SDUs, and may include a function of storing RLC SNs or PDCP SNs of received RLC PDUs and arranging an order to record lost RLC PDUs.

The NR MAC 1d-15 or 1d-30 may be connected to several NR RLC layer devices configured in a single terminal, and main functions of the NR MAC 1d-15 or 1d-30 may include a part of functions below.

Mapping (Mapping between logical channels and transport channels)

Multiplexing and demultiplexing (Multiplexing/demultiplexing of MAC SDUs)

Scheduling information reporting

HARQ (Error correction through HARQ)

Priority handling between logical channels (Priority handling between logical channels of one UE)

Priority handling between UEs (Priority handling between UEs by means of dynamic scheduling)

MBMS service identification

Transport format selection

Padding

An NR physical layer 1d-20 or 1d-25 may perform channel coding and modulation of higher layer data to make the data into OFDM symbols and transmit the OFDM symbols through a wireless channel, or may perform demodulation and channel decoding of OFDM symbols received through a wireless channel, and then transfer the OFDM symbols to a higher layer.

Figure 1E:
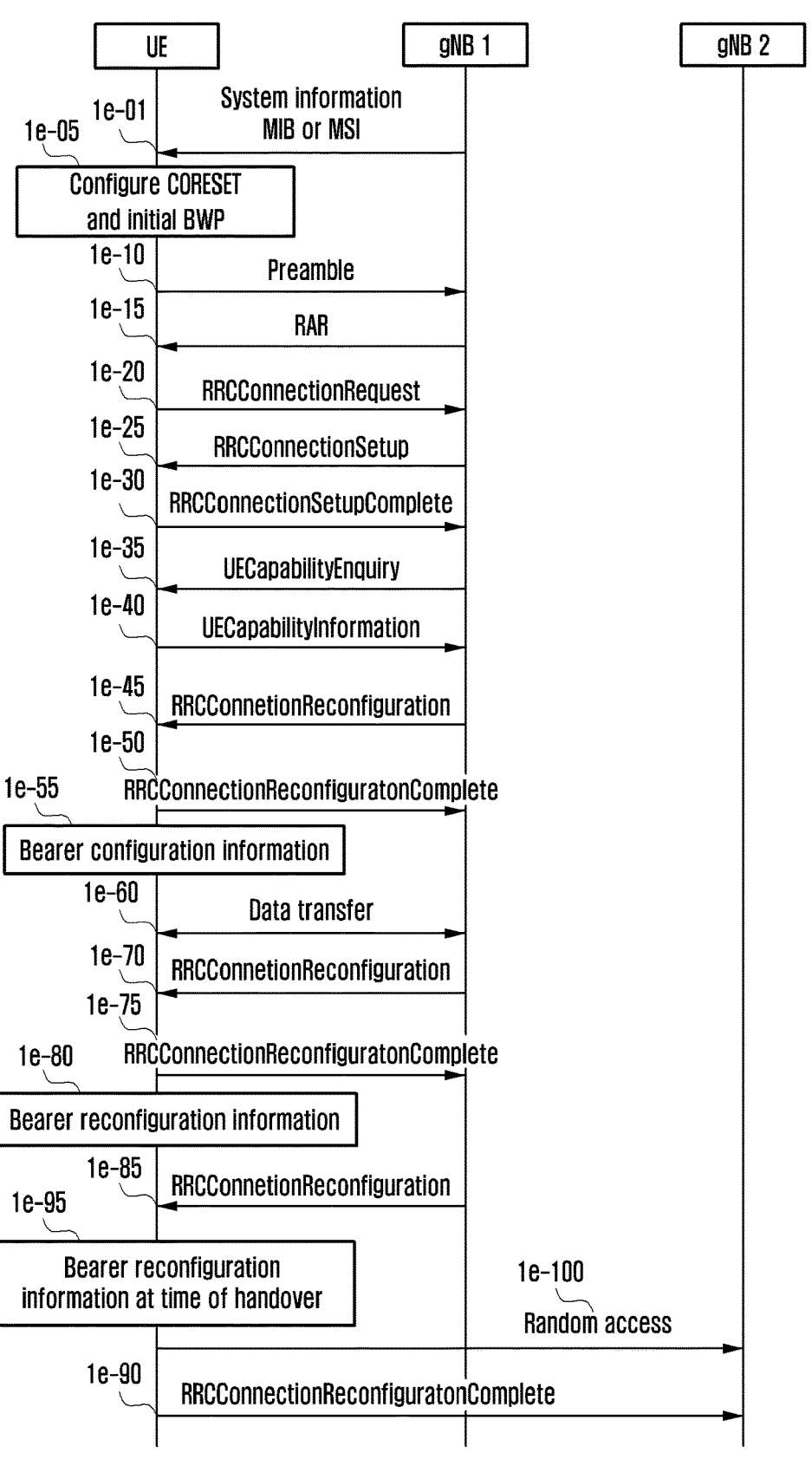
FIG. 1E is a diagram showing a procedure in which a terminal switches from an RRC idle mode to an RRC connected mode in a next generation mobile communication system according to an embodiment of the disclosure, and a method of configuring protocol layer devices or functions of the terminal.

FIG. 1E is a diagram showing a procedure in which a terminal switches from an RRC idle mode to an RRC connected mode in a next generation mobile communication system according to an embodiment of the disclosure, and a method of configuring protocol layer devices or functions of the terminal.

Referring to FIG. 1E, one cell in which a base station provides a service may provide an extremely wide frequency band. First, a terminal may search the entire frequency band provided by a service provider (PLMN) in a predetermined unit of resource blocks (e.g., a unit of 12 resource blocks (RBs)). That is, the terminal may start to search the entire frequency band for a primary synchronization sequence (PSS)/secondary synchronization sequence (SSS) in the unit of resource blocks. If the terminal searches a PSS/SSS in the unit of resource blocks and detects the signals, the terminal may read and interpret (decode) the signals to identify the boundary between a subframe and a wireless transmission resource frame (radio frame). When synchronization is completed, the terminal may read system information of a cell on which the terminal is currently camping. That is, the terminal may identify a master system information block (MIB) or a minimum system information MSI) to identify information of a control resource set (CORESET) and read system information to identify initial bandwidth part (BWP) information (operations 1e-01 and 1e-05). The CORESET information denotes a position of a time/frequency transmission resource in which a control signal is transmitted from a base station, for example, a position of a resource in which a PDCCH channel is transmitted.

When the terminal completes synchronization of a downlink signal with the base station as described above and becomes able to receive a control signal, the terminal may perform a random access procedure in the initial bandwidth part, receive a random access response, request RRC connection configuration, receive an RRC message, and perform RRC connection configuration (operations 1e-10, 1e-15, 1e-20, 1e-25, and 1e-30).

When basic RRC connection configuration is completed, the base station may transmit, to the terminal, an RRC message inquiring of the performance of the terminal in order to identify the performance (UE capability) of the terminal (UECapabilityEnquiry, operation 1e-35) before configuring configuration information for RRC connection for the terminal (operations 1e-45 and 1e-50). As another method, the base station may identify the capability of the terminal via an MME or an AMF. This is because, if the terminal has been previously accessed, the MME or AMF may store capability information of the terminal. The base station may request the capability of the terminal through an RRC message (UECapabilityEnquiry, operation 1e-35), and the terminal may indicate a terminal capability (i.e., a function supported by the terminal) supported by the terminal in an RRC message (UECapabilityInformation, operation 1e-40) in response to the request, and report same to the base station. The reporting procedure may be performed before or after security configuration information is configured, and as another method, the procedure may be performed after configuration information for RRC connection is configured for the terminal through an RRC message as in operations 1e-45 and 1e-50.

When the terminal performs a terminal capability reporting (UE capability report) procedure, an RRC message (e.g., non-access stratum (NAS) message or access stratum (AS) message) reporting the terminal capability may include some or multiple of the following pieces of information.

Whether the terminal supports a data concatenation function or a data segmentation function of a higher layer device A maximum size in which the terminal supports a data concatenation function or a data segmentation function of a higher layer device (e.g., a maximum size of concatenable data or the entire maximum size of data obtained by concatenating multiple pieces of data)

The number of pieces of data which are maximally concatenable when the terminal supports a data concatenation function or a data segmentation function of a higher layer device Whether an integrity protection procedure (or function) is supported for each bearer Whether an integrity protection procedure is supported for a DRB If an integrity protection procedure is supported for a DRB, a maximum data transfer rate (data rate) (e.g., 64 kbps or full rate) supported when the integrity protection procedure is applied, or whether an integrity protection procedure is supported to any data rate regardless of data rates Information on functions supported by the terminal Release information supported by the terminal (e.g., this may be Rel-15, Rel-16, or Rel-17. In addition, for example, if the terminal supports only Rel-15, the base station or a network may consider that the terminal supports an integrity protection procedure with only a data rate of 64 kbps when the procedure is supported for a DRB, or may identify an integrity protection procedure function for a DRB through a capability report message (e.g., non-access stratum (NAS) message or access stratum (AS) message) of the terminal. As another method, if the terminal supports only Rel-15 or Rel-16, the base station or a network may consider that the terminal always supports an integrity protection procedure regardless of data rates when the procedure is supported for a DRB, or may identify an integrity protection procedure function for a DRB through a capability report message (e.g., non-access stratum (NAS) message or access stratum (AS) message) of the terminal.)

Whether the terminal supports deactivation (or disabling) or activation (or enabling) of a data segmentation function (segmentation) (e.g., a data segmentation function of an RLC layer device), or whether the terminal supports deactivation (or disabling) or activation (or enabling) of the data segmentation function (segmentation) for an RLC UM mode or RLC AM mode Whether the terminal supports a new data segmentation method (e.g., a segmentation information (SI) field-based data segmentation method), or supports the new data segmentation method (e.g., a segmentation information (SI) field-based data segmentation method) for an RLC UM mode or RLC AM mode Whether the terminal supports bitmap-based RLC state reporting or the terminal supports the bitmap-based RLC state reporting for an RLC AM mode Whether the terminal supports that, when processing higher layer data, each layer device (e.g., MAC layer device) uses only one header (e.g., one type of MAC header format), or whether the terminal supports that same uses one L field length (e.g., only uses an L field length of 2 bytes)

When a terminal capability report message is received from the terminal, the base station or the network may configure, for the terminal, a data concatenation function or an integrity protection function for each bearer or for each layer device through an RRC message (e.g., RRCReconfiguration message, RRCSetup message, or RRCResume message) (operations 1e-25, 1e-45, 1e-70, and 1e-85).

If there is no terminal capability information desired by the base station, the base station may request a terminal capability from the terminal (operation 1e-35). The base station may transmit an RRC message to the terminal, thereby identifying the performance of the terminal. For example, the base station may identify what level of frequency band the terminal is able to read, or which function the terminal supports and how the terminal supports the same function. After identifying the performance of the terminal, the base station may configure a proper bandwidth part (BWP) or proper functions for the terminal. When the terminal receives an RRC message inquiring of the performance of the terminal from the base station, the terminal may include, in a response for the message, capability information of the terminal related to functions supported by the terminal and transmit the message to the base station (operation 1e-40).

Bearer configuration information, cell group configuration information, cell configuration information, or each layer device information (e.g., an SDAP layer device, PDCP layer device, RLC layer device, MAC layer device, or PHY layer device) may be configured for the terminal through an RRCSetup message or an RRCResume message (operation 1e-25) of RRC connection configuration, or an RRCReconfiguration message (operations 1e-45 and 1e-70), and the RRC message may include configuration information for a Pcell, a Pscell, or multiple cells, and configure multiple bandwidth parts for each cell (PCell, Pscell, or Scell). When an RRCReconfiguration message including the configuration information of the terminal is received (operations 1e-45 and 1e-70), the terminal may apply the configuration information to a bearer or a layer device of the terminal, and configure an RRCRecofigurationComplete message (operations 1e-50 and 1e-75) indicating completion of reconfiguration and transmit the message to the base station.

In addition, when a handover to a different cell or frequency is indicated to the terminal, the base station or the network may configure a handover message (RRCReconfiguration message (operation 1e-85)) including configuration information of a target base station for handover and transmit the message to the terminal. The terminal may perform a handover procedure (e.g., a procedure of random access to the target base station or a procedure of synchronization with the target base station) according to a handover configuration (operation 1e-100), and when the handover is successful, the terminal may configure an RRCRecofigurationComplete message (operations 1e-95 and 1e-90) and transmit the message to the target base station. The configuration information of the target base station may include bearer configuration information, cell group configuration information, cell configuration information, or each layer device information (e.g., an SDAP layer device, PDCP layer device, RLC layer device, MAC layer device, or PHY layer device).

In addition, bearer configuration information, cell group configuration information, cell configuration information, or each layer device configuration information (e.g., an SDAP layer device, PDCP layer device, RLC layer device, MAC layer device, or PHY layer device) of the terminal may be configured through the RRC message (an RRCSetup message or an RRCResume message (operation 1e-25) or an RRCReconfiguration message (operations 1e-45 and 1e-70)), and the RRC message may include the following pieces of information.

An indicator or configuration information indicating whether the terminal is to use or not to use, or is to deactivate (or disable) or activate (or enable) a data segmentation function (segmentation) for each bearer, for each layer device (e.g., RLC layer device), or for an RLC UM mode or RLC AM mode with respect to downlink or uplink An indicator or configuration information indicating whether the terminal is to use or not to use a new data segmentation method (e.g., segmentation information (SI)-based data segmentation method), to use an SI-based data segmentation method, or to use an SO-based data segmentation method for each bearer, for each layer device (e.g., RLC layer device), or for an RLC UM mode or RLC AM mode with respect to downlink or uplink An indicator or configuration information indicating the length of an RLC sequence number to be used by the terminal for each bearer, for each layer device (e.g., RLC layer device), or for an RLC UM mode or RLC AM mode with respect to downlink or uplink (e.g., in a case of the RLC UM mode, an RLC sequence number length of 6 bits or 12 bits, or in a case of the RLC AM mode, an RLC sequence number length of 12 bits or 18 bits)

An indicator or configuration information indicating the length of a PDCP sequence number to be used by the terminal for each bearer or for each layer device (e.g., PDCP layer device) with respect to downlink or uplink (e.g., a PDCP sequence number length of 12 bits or 18 bits)

An indicator or configuration information indicating whether the terminal is to use or not to use a bitmap-based RLC state report (RLC status report) for each bearer, for each layer device (e.g., RLC layer device), or for an RLC AM mode with respect to downlink or uplink Configuration information (or an indicator, one L field length, or an indicator for configuring whether to use a logical channel identifier or an extended logical channel identifier) for configuring each layer device (e.g., MAC layer device) to use only one header (e.g., one type of a MAC header format) when processing higher layer data The base station may transmit an RRC message (e.g., RRCReconfiguration message) including configuration information (or indicator) to the terminal to use the information for each layer device (e.g., PDCP layer device, RLC layer device, or MAC layer device) or each bearer so that the information is configured for each layer or each bearer of the terminal. In addition, a SI field-based data segmentation method or a bitmap-based RLC state report configuration method proposed in the disclosure may be transmitted by the base station to the terminal through an RRC message (e.g., an RRCReconfiguration message) including configuration information (or indicator) so that the terminal uses the header structure for each layer device (e.g., RLC layer device) or each bearer, whereby, the SI field-based data segmentation method or the bitmap-based RLC state report configuration method may be configured to be used by the terminal for each layer or each bearer. Configuration information, included in the RRC message, indicating configuration of a header, an SI field-based data segmentation method, or a bitmap-based RLC state report proposed in the disclosure is allowed to be configured only when each layer device is established, when a bearer is established (or configured), in a case of handover, or in a case of bearer type change. Therefore, using different header structures, different data segmentation methods, or different RLC state reports interchangeably or mixedly may be prevented.

If an SI field-based data segmentation method is not configured or not used, the terminal may use a segment offset (SO) field-based data segmentation method, and in this case, if a bitmap-based RLC state report configuration method is not configured or not used, the terminal may use an RLC sequence number-based RLC state report configuration method.

As another method, it may be proposed that the RRC message (e.g., RRCReconfiguration message) configures a data segmentation method not to be performed, to be deactivated, to be activated, or to be performed for each layer device (e.g., RLC layer device configuration information) or each bearer.

For example, when the RRC message (e.g., RRCReconfiguration message) configures a data segmentation method not to be used (or to be deactivated), the terminal may not use the data segmentation method (SI field-based data segmentation method or SO field-based data segmentation method) for the RLC layer device. If data segmentation is needed, the terminal does not perform data segmentation, and may transmit, to a lower layer device, a data size smaller than that of a transmission resource requested from the lower layer device. When the RRC message (e.g., RRCReconfiguration message) does not configure a data segmentation method not to be used (or the message configures the data segmentation method to be used, or does not include an indicator indicating not to use the data segmentation method), the terminal may use an SO field-based data segmentation method (or may use an RLC header format corresponding to the SO field-based data segmentation method), or if an SI field-based data segmentation method is configured, the terminal may use the SI field-based data segmentation method (or may use an RLC header format corresponding to the SI field-based data segmentation method). In addition, an SI-based data segmentation method, bitmap-based RLC state reporting, or activation (or deactivation) of a data segmentation method, which is proposed above in the disclosure, is limited to be configurable only for a particular RLC mode (e.g., RLC unacknowledged mode (UM) mode or RLC acknowledged mode (AM) mode). Therefore, the number of cases of various implementation methods is reduced, and thus complexity of terminal implementation may be reduced.

Figure 1F:
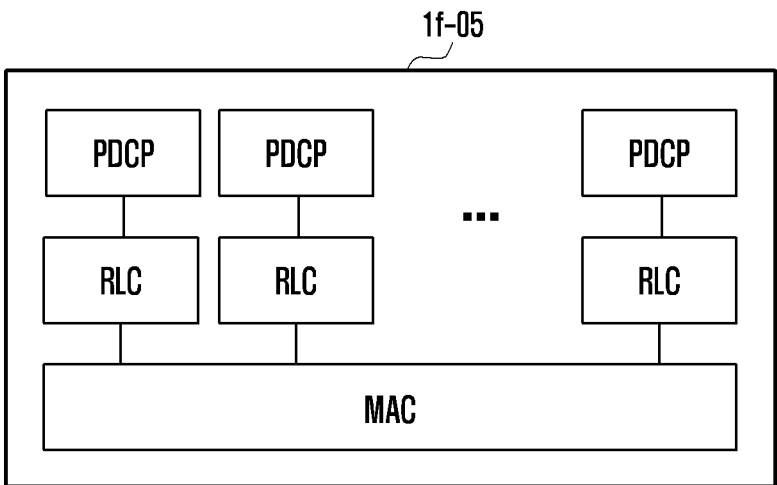
FIG. 1F is a diagram illustrating a structure of a protocol layer device according to an embodiment of the disclosure.

FIG. 1F is a diagram illustrating a structure of a protocol layer device according to an embodiment of the disclosure.

In FIG. 1F, when an RRC message is received from a base station as shown in FIG. 1E, a terminal may receive connection configuration information, bearer configuration information, or protocol layer device information of the terminal, and establish and configure protocol layer devices as indicated by reference numeral 1f-05. For example, the terminal may establish one PHY layer device and one MAC layer device, and may configure multiple bearers to be established for and connected to the MAC layer device. Each of the bearers may be configured by an RLC layer device or a PDCP layer device.

Figure 1G:
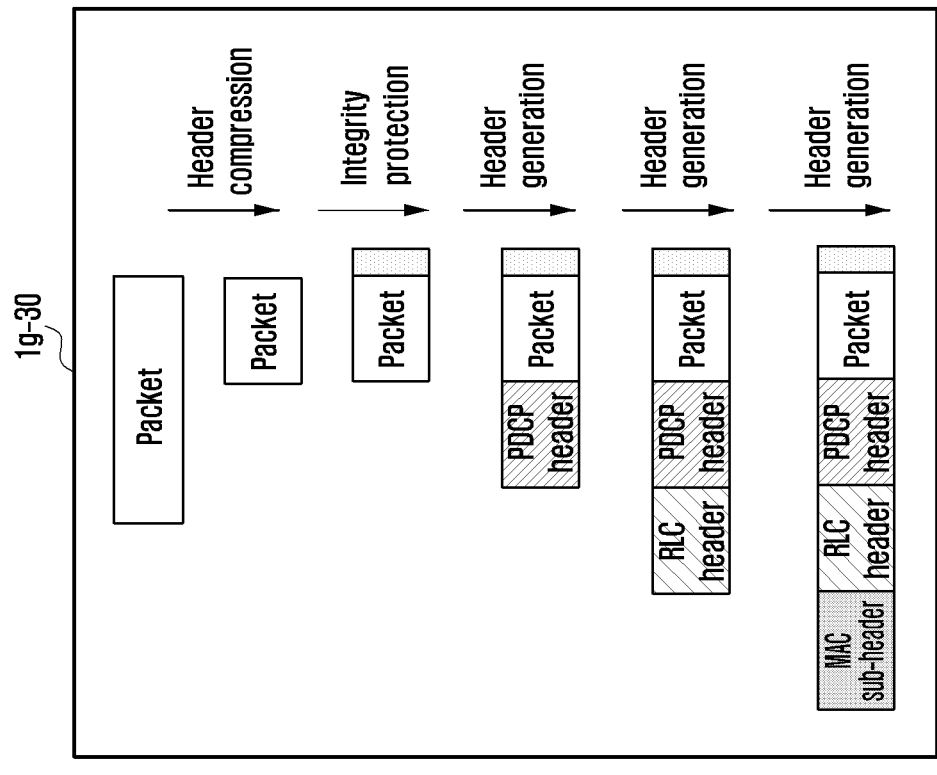
FIG. 1GA is a diagram illustrating an operation in which, in a next generation mobile communication system according to an embodiment of the disclosure, each protocol layer device of a bearer processes data received from a higher layer device and transmits the processed data, or receives data from a lower layer device, processes the data, and transfers the processed data to a higher layer device.

FIG. 1GA, FIG. 1GB, and FIG. 1GC are diagrams illustrating an operation in which, in a next generation mobile communication system according to an embodiment of the disclosure, each protocol layer device of a bearer processes data received from a higher layer device and transmits the processed data, or receives data from a lower layer device, processes the data, and transfers the processed data to a higher layer device.

As illustrated in FIG. 1GA, FIG. 1GB, and FIG. 1GC, if an encryption procedure or security key configuration information is configured in a PDCP layer device, a terminal may derive security keys in an RRC layer device, and when the PDCP layer device is established or reestablished, perform the encryption procedure while applying the security keys. As indicated by reference numeral 1g-05, when data (e.g., a PDCP PDU) is received from a higher layer device, in a case where a header compression procedure or an encryption procedure is configured through an RRC message as illustrated in FIG. 1E, a PDCP layer device may perform the header compression procedure or the encryption procedure for the data, assign a PDCP sequence number, configure a PDCP header, configure the data to be a PDCP PDU, and transmit the PDCP PDU to a lower layer device. An RLC layer device may configure an RLC sequence number and header field values for the data (PDCP PDU), attach an RLC header thereto, and then transmit the data to a MAC layer device, and the MAC layer device may configure the length of the data, configure an MAC header field value, such as a length field and a logical channel identifier corresponding to the data, attach an MAC header thereto, and then transmit the data to a lower layer device (as indicated by reference numeral 1g-15). The RLC layer device may perform a data segmentation procedure when it is needed or uplink transmission resources are insufficient, and update field values of an RLC header or configure segmentation information (e.g., SI field, SO field, or RLC sequence number) to configure an RLC header suitable for each data segment obtained by the data segmentation procedure.

As indicated by reference numeral 1g-10, when data is received from a lower layer device, the terminal may read a MAC header, identify a length field, and detach data, or identify a logical channel identifier, demultiplex the data, and transfer the demultiplexed data to an RLC layer device corresponding to the identifier. When the data is received, the RLC layer device may read an RLC header, identify whether the data is a data segment, remove the RLC header of the data, which is not a data segment, and transfer the data to a PDCP layer device. An RLC layer device may store a data segment in a buffer, when all data segments are received based on segmentation information (e.g., SI field, SO field, or RLC sequence number) about data before being segmented or an RLC sequence number corresponding to the data segment, reassemble the data segments to configure complete data, and transfer the reassembled data to a PDCP layer device. If an encryption procedure is configured, the PDCP layer device may perform a decoding procedure, if the decoded data is aligned in an order based on a PDCP sequence number or a COUNT value or if a header compression procedure is configured, apply a header decompression procedure for the data, and transfer the data to a higher layer device in ascending order based on the COUNT value. If the header compression procedure is not configured, the header compression procedure or the header decompression procedure may be omitted.

As indicated by reference numeral 1g-20, if a header compression procedure, an integrity protection procedure, or an encryption procedure is configured for a PDCP layer device, as indicated by reference numeral 1g-20, a transmission PDCP layer device may apply the header compression procedure to higher layer device data, perform the integrity protection procedure for the header-compressed data or a PDCP header, attach a MAC-I field of 4 bytes to the rear of same, and apply the encryption procedure to the data to which the integrity protection procedure has been applied and the MAC-I field. In addition, as indicated by reference numeral 1g-25, at a reception node, a reception PDCP layer device may apply a decoding procedure to data received from a lower layer device, apply an integrity verification procedure to the decoded data, based on a MAC-I field of 4 bytes attached to the rear side thereof, to identify whether integrity fails, and discard data failing in the integrity verification procedure. If data having passed the integrity verification procedure is aligned in an order based on a PDCP sequence number or a COUNT value or if a header compression procedure is configured, the reception PDCP layer device may apply a header decompression procedure for the data, and transfer the data to a higher layer device in ascending order based on the COUNT value. If the header compression procedure is not configured, the header compression procedure or the header decompression procedure may be omitted.

As indicated by reference numeral 1g-30, if a header compression procedure or an integrity protection procedure is configured for a PDCP layer device, or an encryption procedure is not configured therefor, as indicated by reference numeral 1g-30, a transmission PDCP layer device may apply the header compression procedure to higher layer device data, perform the integrity protection procedure for the header-compressed data or a PDCP header, attach a MAC-I field of 4 bytes to the rear of same, attach a PDCP header to the front of the data to which the integrity protection procedure has been applied and the MAC-I field, and transfer the data, the MAC-I field, and the PDCP header to a lower layer device. In addition, as indicated by reference numeral 1g-35, at a reception node, a reception PDCP layer device may apply an integrity verification procedure to data received from a lower layer device, based on a MAC-I field of 4 bytes attached to the rear side thereof, to identify whether integrity fails, and discard data failing in the integrity verification procedure. If data having passed the integrity verification procedure is aligned in an order based on a PDCP sequence number or a COUNT value or if a header compression procedure is configured, the reception PDCP layer device may apply a header decompression procedure for the data, and transfer the data to a higher layer device in ascending order based on the COUNT value. If the header compression procedure is not configured, the header compression procedure or the header decompression procedure may be omitted.

The transmitted data described above may be generated to have a structure in which a header and data are repeated as indicated by reference numeral 1g-15. For example, the transmitted data may have pieces of data having a repetitive structure including a header (MAC header, RLC header, PDCP header, or SDAP header), data, a header (MAC header, RLC header, PDCP header, or SDAP header), and data. Therefore, in a case of generating data having a structure in which headers having a fixed size described above are repeated, in order to accomplish faster data processing, a hardware accelerator or hardware engine may be applied to reduce a data processing time. Such a hardware accelerator may be applied or retrieved and used when the header (MAC header, RLC header, PDCP header, or SDAP header) is added or removed, or an encryption procedure, a decoding procedure, an integrity protection procedure, or an integrity verification procedure is performed. As described above, if respective headers generated for pieces of data or respective headers required to be processed for pieces of data are fixed headers having the same size for each layer, the efficiency of the hardware accelerator may be further increased. For example, as each PDCP header, a PDCP header having a fixed (e.g., if a PDCP sequence number is configured to have a first length (e.g., 12 bits)) first size (e.g., 2 bytes) may be used, or when a PDCP sequence number is configured to have a second length (e.g., 18 bits), a PDCP header having a fixed second size (e.g., 3 bytes) may be used. In addition, each MAC header may use an L field having a first size (8 bits or 16 bits) according to the size of data received from a higher layer device (e.g., if the size of data received from a higher layer device is smaller than 256 bytes, 0 is indicated as an F field and an L field of 8 bits is used, or if the size of data received from a higher layer device is greater than 256 bytes, 1 is indicated as an F field and an L field of 16 bits is used, or may use a MAC header having a second size (e.g., 2 bytes, 3 bytes, 4 bytes, or 5 bytes) in consideration of a logical channel identifier (identity) (an LCID of 6 bits) or an extended logical channel identifier (identity) (an eLCID of 8 bits or 16 bits). In addition, an RLC layer device may generate and configure different RLC headers, based on a segment information (SI) field, a segment offset (SO) field, or an RLC sequence number field according to a data segmentation method used in the RLC layer device.

In the disclosure, in order to increase the efficiency of the hardware accelerator, methods of fixing the size of a PDCP header, an RLC header, or a MAC header required to be processed (or generated) for each piece of data of a higher layer device may be proposed.

First, in a case of an RLC layer device, a SO field-based data segmentation method is used, and thus RLC headers having different sizes are used according to the types of data segments.

Figure 1H:
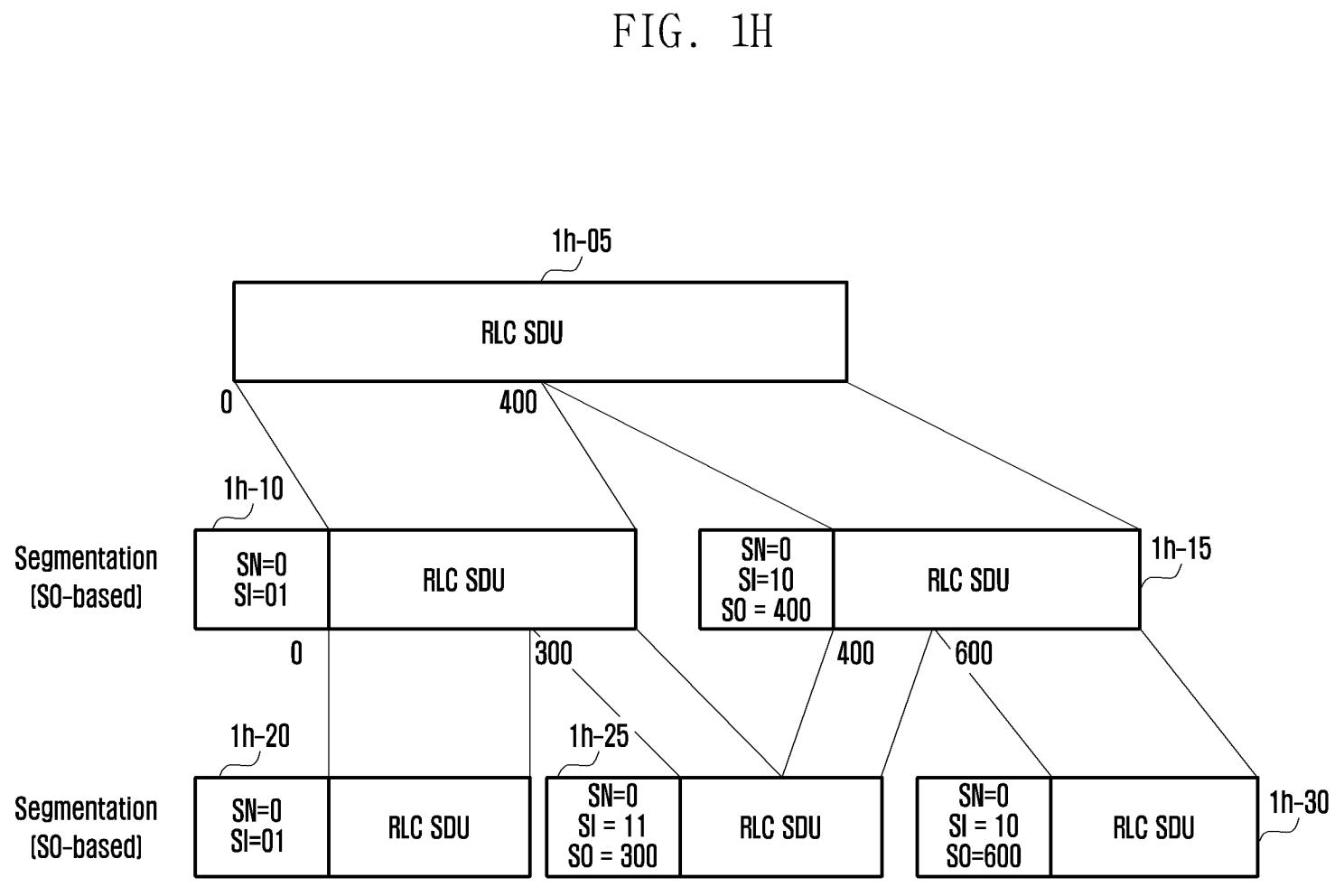

FIG. 1H is a diagram illustrating a SO-based segmentation operation available in an RLC layer RLC AM mode or an RLC UM mode according to an embodiment of the disclosure.

In the disclosure, a procedure and method of performing, in an RLC layer, a segment offset (SO)-based segmentation operation for a packet received from a higher layer may be applied. In the proposed method, in a case where initial transmission or retransmission is performed, an integrated segmentation operation may be performed without distinguishing between when a segmentation operation is performed and when a re-segmentation operation is performed (e.g., when a data segment is retransmitted, the data segment is divided again because uplink transmission resources are insufficient). In addition, concatenation may not be performed in an RLC layer. In addition, an SI field is introduced to an RLC header so as to enable an RLC SDU, which is a data part behind the RLC header, to be classified as a complete RLC SDU having not been segmented, the foremost RLC SDU segment obtained by segmentation, a middle RLC SDU segment obtained by segmentation, or the last RLC SDU segment obtained by segmentation. In addition, an RLC header may has no length field indicating a length.

In FIG. 1H, an RLC layer receives a PDCP PDU (RLC SDU 1h-05) from a PDCP layer that is a higher layer. The RLC SDU 1h-05 may be processed to have a size indicated by a MAC layer, and if same is segmented, the segmented RLC SDU may include segmentation information of a header and configure an RLC PDU. The RLC PDU may be configured by an RLC header and an RLC payload (RLC SDU). The RLC header may include the characteristic (data or control information) of the RLC PDU and segmentation information, and may include a D/C field, a P field, a SI field, an SN field, and a SO field. In an RLC UM mode in which ARQ is not supported, there is no P field, and the P field may be replaced with a reservation field.

A data/control (D/C) field is 1 bit, and is used to indicate whether an RLC PDU configured as shown in Table 1 below is a control PDU or a data PDU.

TABLE 1

| Value | Description |
|-------|-------------|
| 0 | Control PDU |
| 1 | Data PDU |

In a case of an RLC AM mode, a sequence number (SN) field indicates the sequence number of an RLC PDU, and may have a predetermined length. For example, the field may have a length of 12 bits or 18 bits. Also in a case of an RLC UM mode, an SN field indicates the sequence number of an RLC PDU, and may have a predetermined length. For example, the field may have a length of 6 bits or 12 bits. A segment offset (SO) field may have a size of 2 bytes, indicate which position of an original RLC SDU from which an RLC SDU segment is obtained, and is used to indicate the first byte of the obtained segment.

In relation to a P field, when a condition to trigger polling occurs at a transmission node, the P field may be configured to be 1 to enable a reception node to perform RLC state reporting (RLC status report). That is, the reception node is allowed to transfer ACK/NACK information for RLC PDUs received until now, to the transmission node.

In a case of an RLC AM mode, when an RLC layer receives the RLC SDU 1$h$-05, the RLC layer may connect, directly to the RLC SDU, a first transmission window variable (TX_Next) indicating an RLC SN or an RLC sequence number, configure data (AMD PDU) of an RCL layer device by using the RLC SDU, configure an RLC sequence number as the value of the first transmission window variable, and increase the value of the first transmission window variable (TX_Next) by 1. If the data (AMD PDU) is transmitted to a lower layer device, when the data includes a data segment of an RLC SDU, a transmission RLC layer device may configure an RLC sequence number of the data (AMD PDU) as an RCL sequence number corresponding to the RLC SDU corresponding to the data segment.

In a case of an RCL UM mode, when the RLC SDU 1$h$-05 received from a higher layer device is configured to be RLC layer device data (UMD PDU), and the RLC layer device data is transmitted to a lower layer device, if the data (UMD PDU) includes a data segment of an RLC SDU, the RLC sequence number of the data (UMD PDU) may be configured as a first transmission window variable (TX_Next). If the data (UMD PDU) includes a data segment mapped to (corresponding to) the last byte of an RLC SDU, the first transmission window variable (TX_Next) is increased by 1. When the data (UMD PDU) is transmitted to the lower layer device, if the data does not include a data segment of an RLC SDU, includes an RLC SDU, or an RLC SDU having not been segmented, the RLC layer device may not connect an RLC sequence number to the data (UMD PDU), not assign same thereto, or not include same therein, and transfer the data (UMD PDU) to the lower layer device.

An RLC layer device may generate an RLC header and create an RLC PDU. When a segmentation operation is needed due to a predetermined reason, as indicated by reference numeral 1$h$-10 or 1$h$-15, an SI field is updated and a SO field is added to an RLC header, whereby each RLC PDU may be generated. That is, after a segmentation operation, a SO field may be added or not be added to a segment according to a predetermined condition. The predetermined condition may be determined according to an SI field to be described below. The predetermined reason why a segmentation operation is needed may be a case where the size of a MAC SDU and a MAC subheader that are currently generated is greater than that of a transmission resource allocated for an RLC layer device or a logical channel identifier in a MAC layer, and thus a segmentation operation for a particular MAC SDU (RLC PDU) is requested from an RLC layer, or a case where data to be transmitted by the RLC layer device is bigger than the size of the transmission resource allocated for an RLC layer device or a logical channel identifier. The sequence number (SN) field is a sequence number of an RLC PDU, and the length of the RLC sequence number may be configured using each RLC layer device configuration information through an RRC message. The segment offset (SO) field is a field having a predetermined length, may indicate, at the time of initial transmission, which byte number in an original RLC PDU data field (RLC SDU) the first byte of an RLC PDU data field (RLC SDU) obtained by segmentation is, and may indicate, at the time of retransmission, which byte number in an original RLC PDU data field (RLC SDU) the first byte of a RLC PDU data field (RLC SDU) obtained by re-segmentation is. The length of the SO field may be fixed (e.g., 2 bytes) or may be configured by an RRC message (e.g., RRCConnectionSetup message or RRCConnectionReconfiguration message in operations 1$e$-25, 1$e$-45, and 1$e$-70). The segmentation information (SI) field may be defined as shown in Table 2 below, or may be named a different name.

TABLE 2

| Value | Description |
| --- | --- |
| 00 | Data field contains all bytes of an RLC SDU |
| 01 | Data field contains the first segment of an RLC SDU |
| 10 | Data field contains the last segment of an RLC SDU |
| 11 | Data field contains neither the first nor last segment of an RLC SDU |

When a SI field is 00, this indicates a complete RLC SDU having not been segmented, and in this case, a SO field is not required in an RLC header. This is because, if there is no segmentation, a SO field is not necessary. When a SI field is 01, this indicates the foremost RLC SDU segment obtained by segmentation, and in this case, a SO field is not required in an RLC header. This is because, in a case of the first segment, a SO field always indicates 0. When a SI field is 10, this indicates the last RLC SDU segment obtained by segmentation, and in this case, a SO field is required in an RLC header. When a SI field is 11, this indicates a middle RLC SDU segment obtained by segmentation, and in this case, a SO field is required in an RLC header. There may be a total of 24 (=4×3×2×1) mapping relations between the two bits and four pieces of information (a complete RLC SDU, the foremost segment, the last segment, and a middle segment), and the above description shows one example thereamong. The disclosure may include all 24 mapping cases described above. If transmission of RLC PDUs 1$h$-10 and 1$h$-15 fails, retransmission may be performed, and when transmission resources are insufficient, the RLC PDUs may be re-segmented as indicated by reference numerals 1$h$-20, 1$h$-25, and 1$h$-30. A SI field and a SO field of each of the RLC PDUs 1$h$-20, 1$h$-25, and 1$h$-30 that are newly generated at the time of the re-segmentation may be updated. The RLC PDU 1$h$-20 is the foremost segment, and thus an SI field is updated to 01, and an SO field is not required. The RLC PDU 1$h$-25 is a middle segment, and thus an SI field is updated to 11, and an SO field may be updated to 300 so that the SO field indicates which byte number in an original RLC PDU data field (RLC SDU) the first byte of an RLC PDU data field (RLC SDU) is. The RLC PDU 1$h$-30 is the last segment, and thus an SI field is updated to 10, and an SO field may be updated to 600 so that the SO field indicates which byte number in an original RLC PDU data field (RLC SDU) the first byte of an RLC PDU data field (RLC SDU) is. As described above, in a SO field-based data segmentation method, all data segments obtained by segmenting one RLC SDU have the same RLC sequence number (SN) as the RLC SDU. Therefore, data segments being obtained by segmenting the same data or one piece of data may be indicated by the RLC sequence number.

Figure 1I:
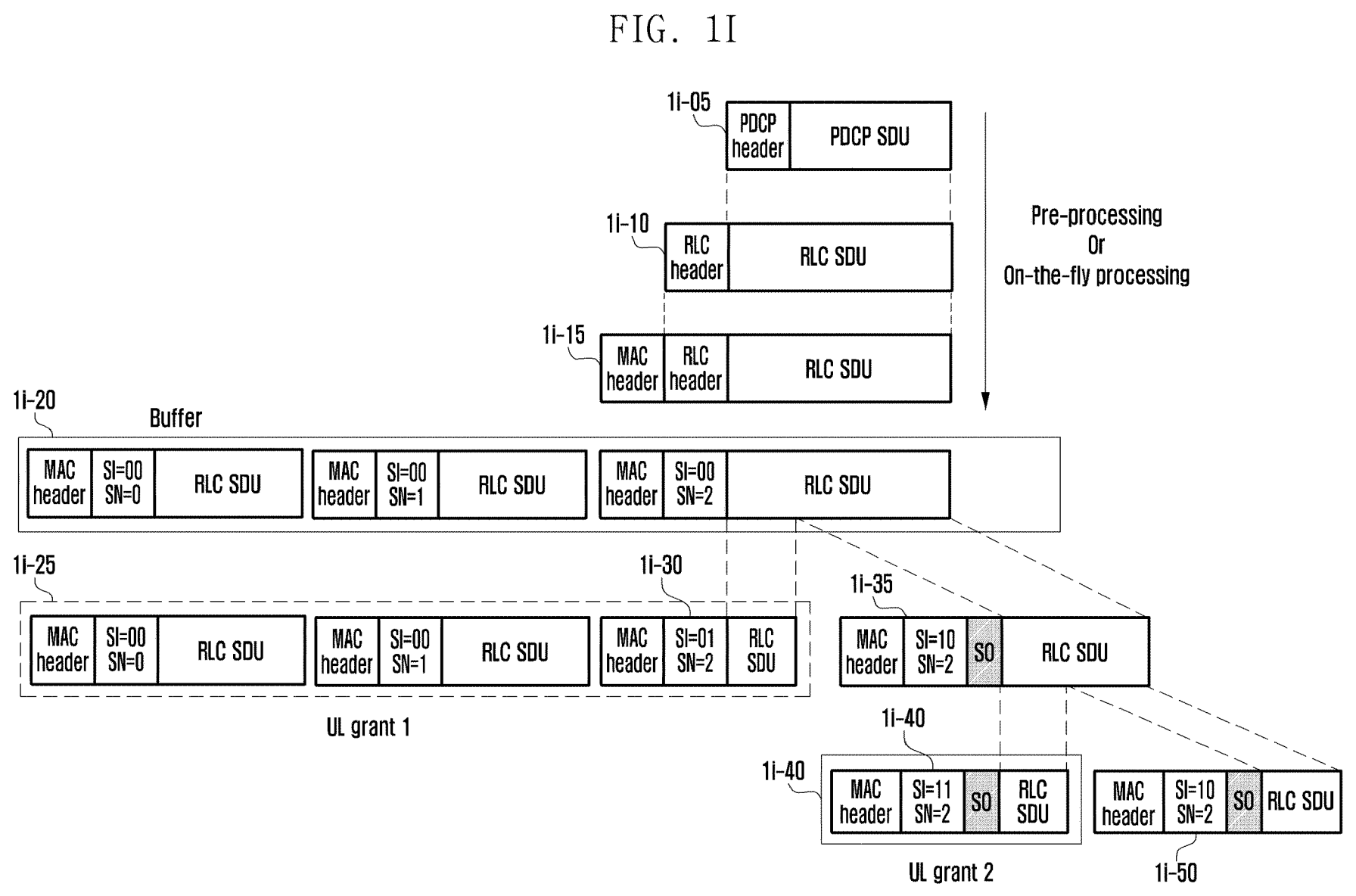

FIG. 1I is a diagram illustrating a data processing operation employing a SO-based segmentation operation of an RLC AM mode or an RLC UM mode according to an embodiment of the disclosure.

In a case of an RLC AM mode, in FIG. 1I, when an IP packet (PDCP SDU) arrives at a PDCP layer, the PDCP layer may attach a PDCP header to the PDCP SDU, and transfer a PDCP PDU (or RLC SDU 1i-05) to an RLC layer. The RLC layer may first generate an RLC header, assign an RLC sequence number, and configure an RLC header to complete an RLC PDU 1i-10, and then transfer same to a MAC layer. The MAC layer may calculate the size of the MAC SDU (or RLC PDU) to configure an L field, configure a logical channel identifier corresponding thereto, configure a MAC subheader 1i-15, and store same in a buffer 1i-20. Therefore, according to the above scheme, data packets received from the PDCP layer may be subject to data pre-processing and then be stored in a buffer before transmission resources (UL grant) are received from a base station, or may be subject to data processing (on-the-fly processing) immediately after transmission resources are received. If a terminal receives an uplink transmission resource (UL grant 1 1i-25) from the base station, but the uplink transmission resource is insufficient and thus a segmentation operation is required to be performed, the terminal may perform a segmentation operation as shown by 1i-30, then configure an SI field for an RLC header of each segment to be suitable for the segment, and then newly configure the RLC header of each segment (1i-30 and 1i-35). As described with reference to FIG. 1H above, an SO field is added to a middle segment or the last segment rather than the first segment, and the offset thereof is required to be indicated. Therefore, an SO field may be added to the RLC header as shown by 1i-35. Thereafter, the terminal may transmit a MAC PDU configured to be suitable for the uplink transmission resource. If a second uplink transmission resource (UL grant 2 1i-45) is received, but the size of the transmission resource is insufficient again and thus is not enough to transmit the 1i-35, the terminal may perform a segmentation operation again, update SI fields to be suitable for newly obtained segments as shown by 1i-40 and 1i-50, update or add SO fields, and configure each RLC header. Thereafter, the terminal may transmit a MAC PDU configured to be suitable for the uplink transmission resource (UL grant 2).

The above procedure may be expanded to a case where an RLC layer device using an RLC UM mode applies a SO field-based data segmentation method. For example, if complete RLC SDUs do not include RLC sequence numbers, and only data segments include RLC sequence numbers, the same procedure described above is performed.

The SO-based segmentation method has a feature where data segments have the same RLC sequence number (SN) as that of an original RLC PDU even when a segmentation operation is performed. Therefore, segments obtained by segmenting one RLC PDU have the same RLC sequence number as that of the original RLC PDU (1i-30, 1i-35, 1i-40, 1i-40, 1i-50).

An RLC layer may operate in an RLC acknowledged mode (AM), an RLC unacknowledged mode (UM), and an RLC transparent mode (TM). In the RCL AM mode, the RLC layer supports an ARQ function, a transmission node may receive an RLC state report (RLC status report) from a reception node, and retransmit lost (NACKed) RLC PDUs through the state report. When the transmission node performs the retransmission, if uplink transmission resources are not enough, the transmission node may also perform a re-segmentation operation. Therefore, this mode ensures transmission of reliable data without error, and is suitable for a service requiring high reliability. In order to efficiently support the ARQ function, accurate information relating to lost RLC PDUs is required. Therefore, an SO field may be very useful. That is, which RLC PDU has been lost, and which part of the RLC PDU has been lost may be indicated more specifically in an RLC state report (RLC status report) through an SO field. If specific information of a lost RLC PDU is received through the SO field, the transmission node may perform a SO-based segmentation operation according to the information to perform retransmission.

Meanwhile, in the RLC UM mode, the ARQ function is not supported. Therefore, RLC state reporting is not performed, and there is no retransmission function. In the RLC UM mode, when or before an uplink transmission resource is received, the RLC layer of the transmission node may function to configure RLC headers for PDCP PDUs (RLC SDUs) received from a higher layer, and transfer same to a lower layer. Therefore, this mode enables continuous data transmission without transmission delay, and may be useful in a service sensitive to transmission delay. Therefore, in the RLC UM mode, the ARQ function is not performed and RLC state reporting is not performed as described above, and thus specific information such as an SO field may not be required in a SO-based segmentation method applied in the RLC AM mode.

Figure 1J:
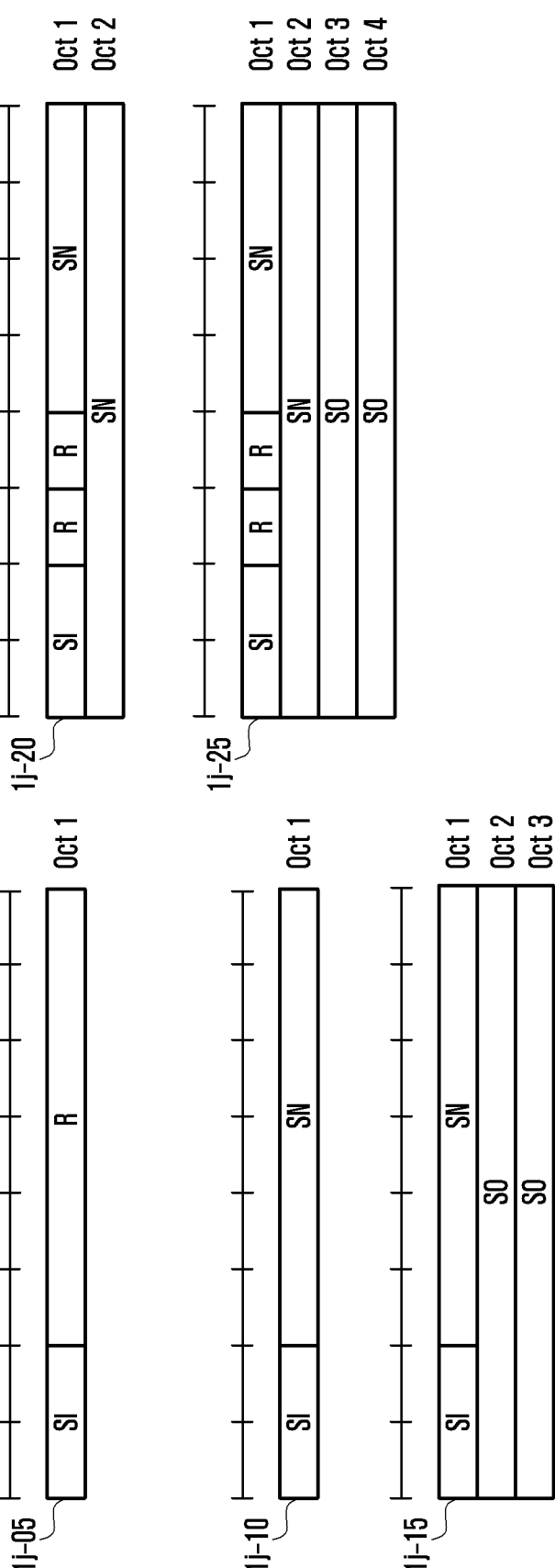
FIG. 1J is a diagram illustrating an example of RLC headers available in an RLC layer device when a SO field-based data segmentation method according to an embodiment of the disclosure is used.

FIG. 1J is a diagram illustrating an example of RLC headers available in an RLC layer device when a SO field-based data segmentation method according to an embodiment of the disclosure is used.

Figure 1K:
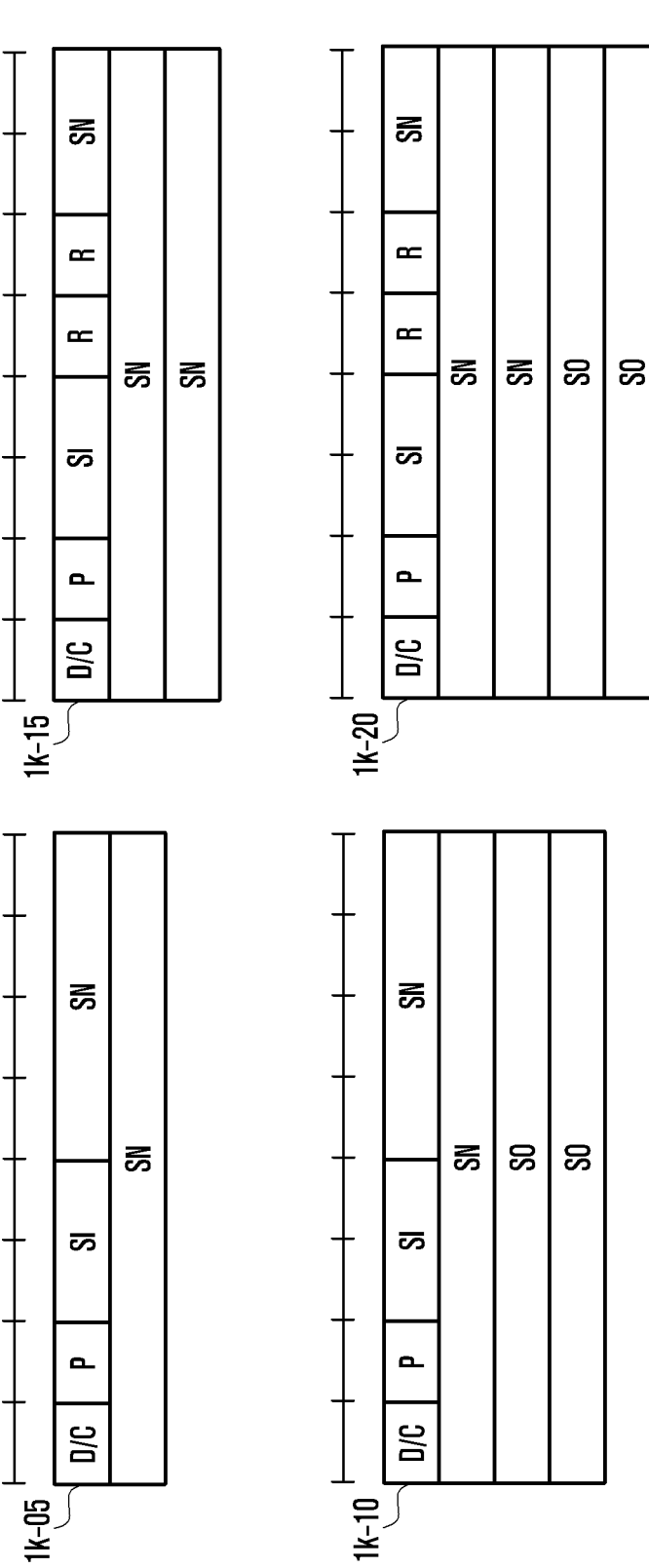
FIG. 1K is a diagram illustrating an example of RLC headers available in an RLC layer device when a SO field-based data segmentation method according to an embodiment of the disclosure is used.

FIG. 1K is a diagram illustrating an example of RLC headers available in an RLC layer device when a SO field-based data segmentation method according to an embodiment of the disclosure is used.

When a SO field-based data segmentation method proposed above in the disclosure is applied, a method of configuring RLC layer device data (UMD PDU or AMD PDU) by an RLC layer device is as follows.

In a case of an RLC layer device using an RLC UM mode, RLC layer device data (UMD PDU) is configured by a data field and a header, and the header may be configured by a unit of bytes (byte alignment). When the RLC layer device data (UMD PDU) includes a complete RLC SDU, the header of the RLC layer device data (UMD PDU) may include only an SI field and a reservation field (R field) (for example, 1j-05). In the RLC layer device using the RLC UM mode, the length of an RLC sequence number may be configured as 6 bits or 12 bits through an RRC message. The header of the RLC layer device data (UMD PDU) may include an RLC sequence number only when an RLC SDU corresponding to the header is segmented (for example, 1j-10, 1j-15, 1j-20, and 1j-25). In addition, when the RLC layer device data (UMD PDU) includes the first data segment of an RLC SDU, the header of the RLC layer device data (UMD PDU) does not include an SO field (for example, 1j-10 or 1j-20). The length of the SO field is 16 bits. In addition, when the RLC layer device data (UMD PDU) includes a middle data segment or the last data segment (middle segment or last segment) of an RLC SDU, or when the RLC layer device data (UMD PDU) includes a data segment (RLC SDU segment) other than the first data segment, the header of the RLC layer device data (UMD PDU) may include an SO field (for example, 1j-15 or 1j-25).

In a case of an RLC layer device using an RLC AM mode, RLC layer device data (AMD PDU) is configured by a data field and a header, and the header may be configured by a unit of bytes (byte alignment). In the RLC layer device using the RLC AM mode, the length of an RLC sequence number may be configured as 12 bits or 18 bits through an RRC message. The header of the RLC layer device data (AMD PDU) may include a D/C field, a P field, a SI field, an SN field (RLC sequence number field), or a reservation field (R field) (for example, 1*k*-05, 1*k*-10, 1*k*-15, and 1*k*-20). In addition, when the RLC layer device data (AMD PDU) includes a middle data segment or the last data segment (middle segment or last segment) of an RLC SDU, or when the RLC layer device data (AMD PDU) includes a data segment (RLC SDU segment) other than the first data segment, the header of the RLC layer device data (AMD PDU) may include an SO field (for example, 1*k*-10 and 1*k*-20). In addition, when the RLC layer device data (AMD PDU) includes the first data segment of an RLC SDU, or when the RLC layer device data (AMD PDU) includes a complete RLC SDU (or not segmented data), the header of the RLC layer device data (AMD PDU) does not include an SO field (for example, 1*k*-05 or 1*k*-15). The length of the SO field is 16 bits.

In the following description of the disclosure, a SI field-based data segmentation method is proposed, whereby a method of reducing header overhead caused by a SO field and using an RLC header having a fixed size regardless of whether data is segmented may be proposed. A terminal and a base station may basically use the SO field-based data segmentation method proposed above, and in a case where a proposed SI field-based data segmentation method is configured through an RRC message or in a case of a terminal supporting a SI field-based data segmentation method, a SI field-based data segmentation method may be used.

FIG. 1L is a diagram illustrating a SI field-based segmentation method (segmentation) proposed for an RLC UM mode or an RLC AM mode according to an embodiment of the disclosure.

A SI field-based segmentation method (segmentation) proposed in FIG. 1L does not require an SO field unlink a SO field-based data segmentation method (segmentation) proposed in FIG. 1H. That is, there is an advantage in that overhead is much smaller. That is, a SO field corresponding to two bytes is not necessary, and thus overhead is reduced and waste of transmission resources may be reduced. In addition, variability of the size of an RLC header is reduced, and thus the efficiency of a hardware accelerator repeatedly processing a header having a fixed size may be increased.

There are the two biggest differences between a segmentation method proposed in FIG. 1H and a SI field-based segmentation method proposed in FIG. 1L.

1. Assignment of RLC sequence number: In FIG. 1H, even when several segments are generated for one RLC SDU by a segmentation operation, the segments have the same RLC sequence number. That is, although a segmentation operation is performed for one RLC SDU and thus generates four segments including segment 1, segment 2, segment 3, and segment 4, the four segments have the same RLC sequence number, and distinguishment between the four segments may be possible by indicating the type of each segment and an offset at which the RLD SDU is segmented, by using an SI field or an SO field of a corresponding segment. Meanwhile, in a SI field-based segmentation method proposed in FIG. 1L, when four segments 1*l*-10, 1*l*-15, 1*l*-20, and 1*l*-25 are generated from one RLC SDU 1*l*-05 as described above, different RLC sequence numbers may be assigned to the respective segments. That is, the RLC sequence numbers 0, 1, 2, and 3 are assigned to the segments 1*l*-10, 1/15, 1*l*-20, and 1*l*-25, and an SI field may be configured according to whether the segment is the first segment, a middle segment, and the last segment. Therefore, an RLC sequence number (or SN field) may be used to distinguish the order (turn) of each segment, and a SI field may be used to distinguish the first segment or the last segment of an RLC SDU, and distinguish middle segments between the first segment and the last segment. For example, in a case where three or more segments are generated, several segments existing in the middle (segments having the same SI field) may be distinguished by the order of the RLC sequence numbers. Therefore, a reception node is able to perform reassembling by using only a combination of an RLC sequence number (or SN field) and a SI field (without a SO field).

2. Disuse of SO field: In FIG. 1H, each segment is assigned the same RLC sequence number, and thus a SI field or a SO field is required to distinguish same. However, in FIG. 1L, different RLC sequence numbers are assigned to the segments 1*l*-10, 1*l*-15, 1*l*-20, and 1*l*-25 and an SI field is configured, and thus a SO field is not necessary.

The segmentation information (SI) field may be defined as shown in Table 3 below, or may be named a different name.

TABLE 3

| Value | Description |
|---|---|
| 00 | Data field contains all bytes of an RLC SDU |
| 01 | Data field contains the first segment of an RLC SDU |
| 10 | Data field contains the last segment of an RLC SDU |
| 11 | Data field contains neither the first nor last segment of an RLC SDU |

When a SI field is 00, this indicates a complete RLC SDU having not been segmented, and in this case, a SO field is not required in an RLC header. This is because, if there is no segmentation, a SO field is not necessary. When a SI field is 01, this indicates the foremost RLC SDU segment obtained by segmentation, and in this case, a SO field is not required in an RLC header. This is because, in a case of the first segment, a SO field always indicates 0. When a SI field is 10, this indicates the last RLC SDU segment obtained by segmentation, and in this case, a SO field may be required in an RLC header. However, in the SI field-based segmentation method, a SO field may not be necessary. When a SI field is 11, this indicates a middle RLC SDU segment obtained by segmentation, and in this case, a SO field may be required in an RLC header. However, in the SI field-based segmentation method, a SO field may not be necessary. There may be a total of 24 (=4×3×2×1) mapping relations between the two bits and four pieces of information (a complete RLC SDU, the foremost segment, the last segment, and a middle segment), and the above description shows one example thereamong. The disclosure may include all 24 mapping cases described above. A SI field-based data segmentation method proposed in the disclosure may be configured or used in an RLC UM mode or RLC AM mode. In the disclosure, a method of assigning or configuring an RLC sequence number to or for an RLC SDU or an RLC header according to whether a SI field-based data segmentation method is configured or used may be proposed as follows.

1> If a SO field-based data segmentation method is used (or configured), or if a SI field-based data segmentation method is not configured (or not used), 2> In a case of an RLC AM mode, when an RLC layer receives an RLC SDU, the RLC layer may connect, directly to the RLC SDU, a first transmission window variable (TX_Next) indicating an RLC SN or an RLC sequence number, configure data (AMD PDU) of an RCL layer device by using the RLC SDU, configure an RLC sequence number as the value of the first transmission window variable, and increase the value of the first transmission window variable (TX_Next) by 1. If the data (AMD PDU) is transmitted to a lower layer device, when the data includes a data segment of an RLC SDU, a transmission RLC layer device may configure an RLC sequence number of the data (AMD PDU) as an RCL sequence number corresponding to the RLC SDU corresponding to the data segment.

2> In a case of an RCL UM mode, when an RLC SDU received from a higher layer device is configured to be RLC layer device data (UMD PDU), and the RLC layer device data is transmitted to a lower layer device, if the data (UMD PDU) includes a data segment of an RLC SDU, the RLC sequence number of the data (UMD PDU) may be configured as a first transmission window variable (TX_Next). If the data (UMD PDU) includes a data segment mapped to (corresponding to) the last byte of an RLC SDU, the first transmission window variable (TX_Next) is increased by 1. When the data (UMD PDU) is transmitted to the lower layer device, if the data does not include a data segment of an RLC SDU, includes an RLC SDU, or an RLC SDU having not been segmented, the RLC layer device may not connect an RLC sequence number to the data (UMD PDU), not assign same thereto, or not include same therein, and transfer the data (UMD PDU) to the lower layer device.

1> If a SI field-based data segmentation method is used (or configured), or if a SO field-based data segmentation method is not configured (or not used), 2> In a case of an RLC AM mode, if an RLC layer receives an RLC SDU, when the RLC layer configures data (AMD PDU) of an RLC layer device by using a complete RLC SDU or an RLC SDU segment corresponding to the RLC SDU and transmits same to a lower layer device, the RLC sequence number of the data (AMD PDU) of the RLC layer device is configured as the first transmission window variable value (TX_Next), and the value of the first transmission window variable (TX_Next) is increased by 1. When the data (AMD PDU) is transmitted to the lower layer device, the data (AMD PDU) may include a complete RLC SDU having not been segmented or a data segment. That is, different RLC sequence numbers may be assigned to complete RLC SDUs or data segments, respectively.

2> In a case of an RCL UM mode, when an RLC layer configures an RLC SDU received from a higher layer device to be RLC layer device data (UMD PDU), and transmits the RLC layer device data to a lower layer device, if the data (UMD PDU) includes a data segment of an RLC SDU, the RLC sequence number of the data (UMD PDU) may be configured as a first transmission window variable (TX_Next). Thereafter, the first transmission window variable (TX_Next) is increased by 1. When the data (UMD PDU) is transmitted to the lower layer device, if the data does not include a data segment of an RLC SDU, includes an RLC SDU, or an RLC SDU having not been segmented, the RLC layer device may not connect an RLC sequence number to the data (UMD PDU), not assign same thereto, or not include same therein, and transfer the data (UMD PDU) to the lower layer device.

Figure 1M:
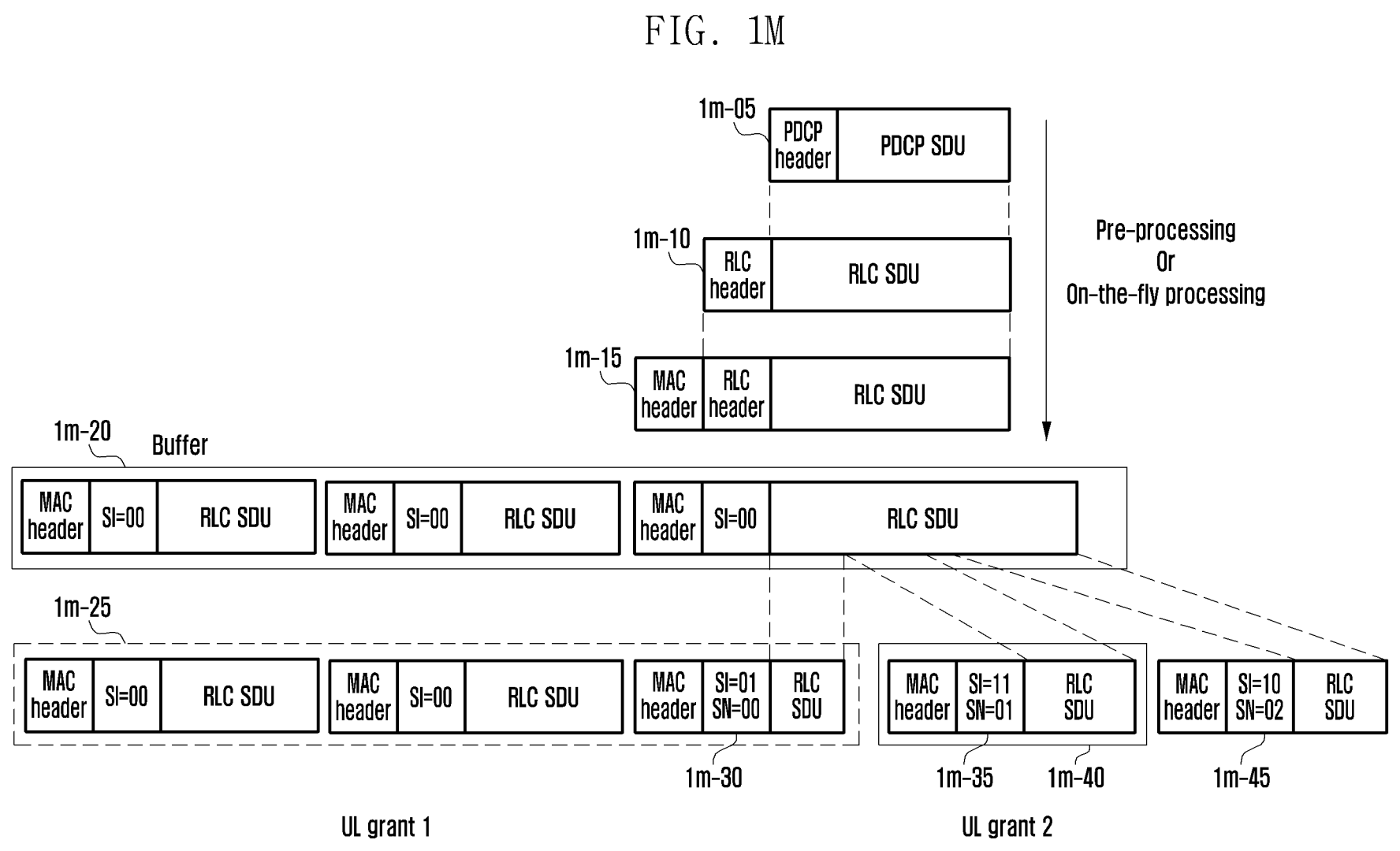

FIG. 1M is a diagram illustrating a data processing operation employing a SI-based segmentation method of an RLC UM mode or an RLC AM mode according to an embodiment of the disclosure.

In a case of an RLC UM, in FIG. 1M, when an IP packet (PDCP SDU) arrives at a PDCP layer, the PDCP layer may attach a PDCP header to the PDCP SDU, and transfer a PDCP PDU (or RLC SDU 1m-05) to an RLC layer. The feature of the RLC UM mode proposed in the disclosure is not assigning an RLC sequence number to an RLC PDU for which a segmentation operation has not been performed. Therefore, the RLC layer may not assign an RLC sequence number, and configure an RLC header to complete an RLC PDU 1m-10, and then transfer same to a MAC layer. The MAC layer may calculate the size of the MAC SDU (or RLC PDU) to configure an L field, configure a logical channel identifier corresponding thereto, configure a MAC sub-header 1m-15, and store same in a buffer 1m-20. Therefore, according to the above scheme, data packets received from the PDCP layer may be subject to data pre-processing and then be stored in a buffer before transmission resources (UL grant) are received from a base station, or may be subject to data processing (on-the-fly processing) immediately, as described above, after transmission resources are received. If a terminal receives an uplink transmission resource (UL grant 1 1m-25) from the base station, but the uplink transmission resource is insufficient and thus a segmentation operation is required to be performed, the terminal may, as shown by a segment 1m-30, assign different RLC sequence numbers to RLC headers of respective segments, configure a SI field according to whether each segment is the first segment, a middle segment, or the last segment for an original RLC PDU, and then newly configure the RLC headers of the segments (segments 1m-30 and 1m-35). Thereafter, the terminal may configure a MAC PDU to be suitable for the uplink transmission resource and then transmit same. If a second uplink transmission resource (UL grant 2 1m-45) is received, but the size of the transmission resource is insufficient again and thus a segmentation operation is required again, the terminal may update the SI fields of pieces 1m-35 and 1m-45 of data obtained by re-segmentation according to whether each piece of data is the first segment, a middle segment, or the last segment for an original RLC PDU, assign a new RLC sequence number to a newly obtained segment, configure the SI field of a segment generated by the segmentation operation according to whether the segment is the first segment, a middle segment, or the last segment for an original RLC PDU, and then newly configure the RLC header. That is, even when different segments are obtained by segmenting one RLC SDU, different RLC sequence numbers increasing by 1 are assigned to the respective segments in ascending order.

Therefore, it may be noted that a transmission or reception operation in an RLC UM mode proposed in FIG. 1L provided in the disclosure as described above is possible even in a procedure of processing data first.

The above procedure may be expanded to a case where an RLC layer device using an RLC AM mode applies a SI field-based data segmentation method. For example, if complete RLC SDUs include RLC sequence numbers, and data segments also include different RLC sequence numbers, the same procedure described above is performed.

Figure 1N:
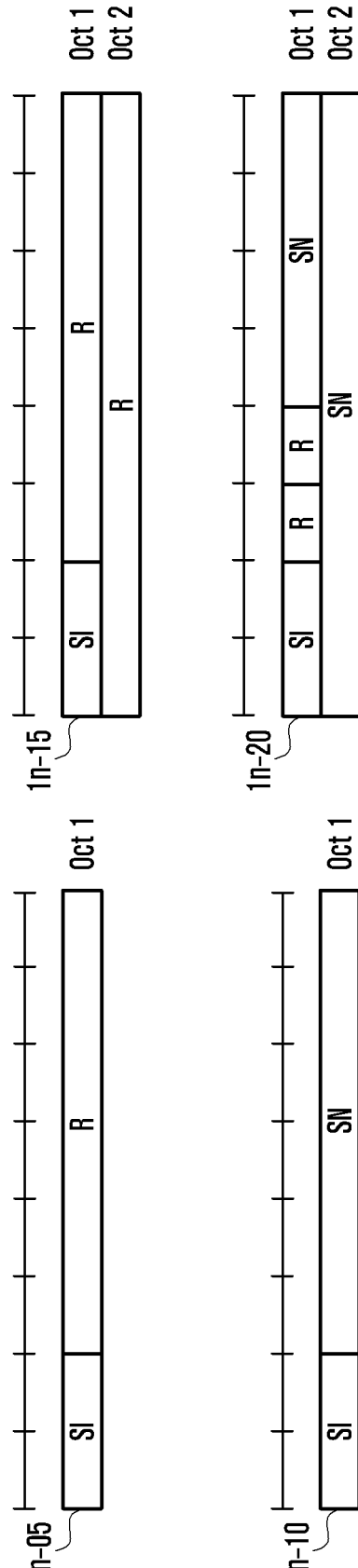
FIG. 1N is a diagram illustrating an example of RLC headers available in an RLC layer device when a SI field-based data segmentation method according to an embodiment of the disclosure is used.

FIG. 1N is a diagram illustrating an example of RLC headers available in an RLC layer device when a SI field-based data segmentation method according to an embodiment of the disclosure is used.

FIG. 1O is a diagram illustrating an example of RLC headers available in an RLC layer device when a SI field-based data segmentation method according to an embodiment of the disclosure is used.

When a SI field-based data segmentation method proposed above in the disclosure is applied, a method of configuring RLC layer device data (UMD PDU or AMD PDU) by an RLC layer device is as follows.

In a case of an RLC layer device using an RLC UM mode, RLC layer device data (UMD PDU) is configured by a data field and a header, and the header may be configured by a unit of bytes (byte alignment). When the RLC layer device data (UMD PDU) includes a complete RLC SDU, does not include a data segment, or has not been segmented, the header of the RLC layer device data (UMD PDU) may include only an SI field and a reservation field (R field) (e.g., a header $1n$-05 or $1n$-15). In the RLC layer device using the RLC UM mode, the length of an RLC sequence number may be configured as 6 bits or 12 bits through an RRC message. The header of the RLC layer device data (UMD PDU) may include an RLC sequence number only when an RLC SDU corresponding to the header is segmented (e.g., headers $1n$-10 and $1n$-20). That is, when the RLC layer device data (UMD PDU) includes a data segment (first segment, middle segment, or last segment) of an RLC SDU, the header of the RLC layer device data (UMD PDU) may include an SN field and a SI field, and the SN field may be assigned in ascending order in which different RLC sequence numbers increase by 1. In addition, in order to use an RLC header having a fixed size regardless of whether a data segmentation operation is performed, as proposed above in the disclosure, for example, in a case where an RLC sequence number length is configured as 6 bits, header formats $1n$-05 and $1n$-10 may be used, or in a case where an RLC sequence number length is configured as 12 bits, header formats $1n$-15 and $1n$-20 may be used. As another method, in order to reduce header overhead, in a case where an RLC sequence number length is configured as 12 bits, header formats $1n$-05 and $1n$-20 may also be used.

In a case of an RLC layer device using an RLC AM mode, RLC layer device data (AMD PDU) is configured by a data field and a header, and the header is configured by a unit of bytes (byte alignment). In the RLC layer device using the RLC AM mode, the length of an RLC sequence number may be configured as 12 bits or 18 bits through an RRC message. The header of the RLC layer device data (AMD PDU) may include a D/C field, a P field, a SI field, an SN field (RLC sequence number field), or a reservation field (R field) (for example, headers $1o$-05 and $1o$-10). In addition, when the RLC layer device data (AMD PDU) includes a data segment (first segment, or middle or last data segment (middle segment or last segment) of an RLC SDU), and even when the RLC layer device data (AMD PDU) includes data (complete RLC SDU) having not been segmented, the same RLC header format may be used. That is, in order to use an RLC header having a fixed size regardless of whether a data segmentation operation is performed, as proposed above in the disclosure, for example, in a case where an RLC sequence number length is configured as 12 bits, a header format $1o$-05 may be used, or in a case where an RLC sequence number length is configured as 18 bits, a header format $1o$-10 may be used. That is, when the RLC layer device data (AMD PDU) includes a data segment (first segment, middle segment, or last segment) of an RLC SDU, or when the RLC layer device data (AMD PDU) includes data (complete RLC SDU) having not been segmented, the header of the RLC layer device data (AMD PDU) may include a D/C field, a P field, a SI field, an SN field (RLC sequence number field), or a reservation field (R field), and the SN field may be assigned in ascending order in which different RLC sequence numbers increase by 1.

When a data segmentation method is configured not to be used or is not used in an RLC layer device in an AM mode in the disclosure, a terminal may use or configure and transmit a bitmap-based RLC state report proposed above in the disclosure so as to improve a data processing speed of a reception node. As another method, when a data segmentation method is configured not to be used or is not used in an RLC layer device in an AM mode in the disclosure, a terminal may use or configure and transmit an RLC state report using ACK_SN, NACK_SN, NACK_RANGE, or SO fields.

When a SI field-based data segmentation method proposed above in the disclosure is configured or used in an RLC layer device in an AM mode, a terminal may use or configure and transmit a bitmap-based RLC state report proposed above in the disclosure so as to improve a data processing speed of a reception node. As another method, when a SI field-based data segmentation method proposed above in the disclosure is configured or used in an RLC layer device in an AM mode, a terminal may use or configure and transmit an RLC state report using ACK_SN, NACK_SN, NACK_RANGE, or SO fields.

When a SI field-based data segmentation method proposed above in the disclosure is configured or used in an RLC layer device in an AM mode, in a case where data re-segmentation is required, a terminal may apply the following methods. The data re-segmentation may imply a case where, when retransmission of already transmitted data (e.g., a data segment or complete data (having not been segmented)) is performed (e.g., when some data has already been transmitted but an RLC state report indicates that the data has not been successfully received, and thus retransmission is required), uplink transmission resources are insufficient and thus a data segmentation method is required to be applied again for the data (e.g., a data segment).

First method: In the first method, when a SI field-based data segmentation method proposed above in the disclosure is configured or used in an RLC layer device in an AM mode, the data re-segmentation may not be allowed. For example, when retransmission of already transmitted data (e.g., a data segment or complete data (having not been segmented)) is performed (e.g., when some data has already been transmitted but an RLC state report indicates that the data has not been successfully received, and thus retransmission is required), if uplink transmission resources are insufficient and thus a data segmentation method is required to be applied again for the data (e.g., a data segment or complete data (having not been segmented)), a data segmentation method may not be applied again for the data or data re-segmentation may not be performed, and the data may not be included and transmitted (or a padding may be transmitted in the remaining transmission resources instead of the data). Thereafter, if an uplink transmission resource which is large enough to transmit the data is received, the data may be allowed to be transmitted.

Second method: In the second method, when a SI field-based data segmentation method proposed above in the disclosure is configured or used in an RLC layer device in an AM mode, if transmission resources for initially transmitted data are insufficient and thus a data segmentation method is required to be performed, a SI field-based data segmentation method proposed in the disclosure may be applied. However, when retransmission of already transmitted data (e.g., a data segment or complete data (having not been segmented)) is performed (e.g., when some data has already been transmitted but an RLC state report indicates that the data has not been successfully received, and thus retransmission is required), if uplink transmission resources are insufficient and thus a data segmentation method is required to be applied again for the data (e.g., a data segment) (i.e., if data re-segmentation is required to be performed), a SO field-based data segmentation method proposed in the disclosure may be applied to the data (e.g., an RLC SDU) so that a data re-segmentation procedure is performed. A new indicator may be introduced to an RLC header so that the indicator indicates whether a SO field-based data segmentation method has been applied, a SI field-based data segmentation method has been applied, or data re-segmentation has been performed. In addition, when data for which a data re-segmentation procedure has been performed as described above is received, a reception RLC layer device may configure an RLC state report using ACK_SN, NACK_SN, NACK_RANGE, or SO fields, or a bitmap-based RLC state report and transmit same to a transmission RLC layer device.

Figure 1P:
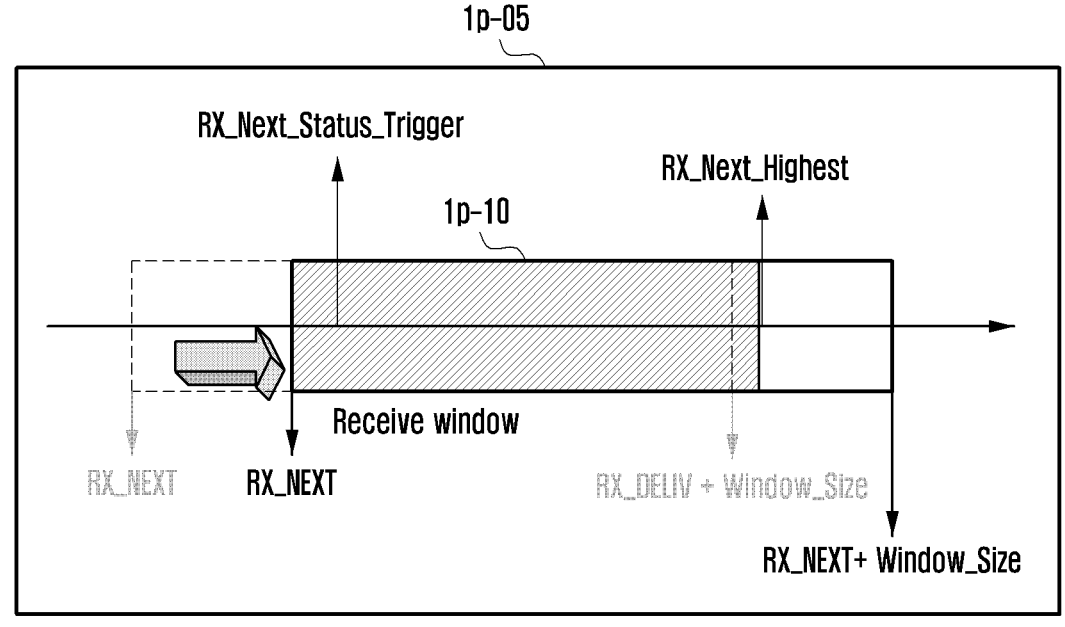
FIG. 1P is a diagram illustrating an operation of operating an RLC reception window in an RLC layer device according to an embodiment of the disclosure.

FIG. 1P is a diagram illustrating an operation of operating an RLC reception window in an RLC layer device according to an embodiment of the disclosure.

Referring to FIG. 1P, as indicated by reference numeral 1p-05, an RLC reception window may be operated by window variables. For example, a first variable (RX_NEXT) indicates a next RLC sequence number for data having the lowest RLC sequence number, which has been successfully received in sequence, and a second variable (RX_NEXT_Highest) may indicate an RLC sequence number considered to be received next, or a next RLC sequence number for one piece of data having the highest RLC sequence number among received pieces of data. In the reception window, a list for mapping an RLC sequence number, data, or whether reception is successful is configured for RLC sequence numbers between the first variable and the second variable, and a linked list may be implemented to allow search of a sequence number or data. A transmission window may operate in a transmission RLC layer device, as described above, a list for mapping an RLC sequence number, data, or whether reception is successful is configured, and a linked list may be implemented to allow search of a sequence number or data. The configured linked lists may be used when an RLC layer device performs an ARQ procedure, more specifically, when the RLC layer device updates the window variables, configures an RLC state report, or performs a retransmission procedure in an RLC ARQ procedure, and the linked lists may be used when pieces of data are searched for or information is updated by scanning the linked list based on RLC sequence numbers.

When a SI-based segmentation method is applied without using sequence numbers in an RLC UM mode in the disclosure, a reception node operation is as follows.

A reception node RLC layer device may receive an RLC PDU, identify a SI field in an RLC header, and distinguish whether the received RLC PDU is an RLC PDU (complete RLC PDU) for which a segmentation operation is not performed, or is an RLC PDU (segment) obtained by a segmentation operation. If the RLC PDU is an RLC SDU for which a segmentation operation has not been performed, the reception node RLC layer device may remove the RLC header and transmit the RLC SDU up to a higher layer. If the RLC PDU is an RLC SDU obtained by a segmentation operation, the reception node RLC layer device may identify an SI field, identify whether the RLC SDU is the first segment, a middle segment, or the last segment, store and arrange the RLC SDU in consideration of or according to the RLC sequence number, when a re-assembly function is triggered by a window or a timer, perform reassembling to make a complete RLC SDU, transfer same to a higher layer, and when re-assembly is impossible, may discard the RLC SDU (or when the timer is expired, packets remaining in a buffer may be immediately discarded).

The procedure may be easily expanded to a procedure of an RLC AM mode, and the only difference is including an RLC sequence number for complete data (complete RLC SDU) as well as a data segment regardless of whether data segmentation has been performed. Therefore, in consideration of this difference, the contents of the disclosure may be easily expanded to the RLC AM mode.

In the disclosure, an embodiment of an operation of transmission node and reception node RLC layer devices in an RLC UM mode is as follows.

A transmission node RLC UM mode device may manage a variable called VT(S) (this variable may be reused as a different variable or may be named a different name). The variable VT(S) is an RLC sequence number value assigned by a transmission node to segments obtained by a segmentation operation, and segments obtained by segmenting one RLC SDU may have different RLC sequence numbers, that is, different values of VT(S). A reception node may configure a timer configured by a base station and a timer value. The VT(S) value may be initially configured as 0.

If data occurs in an RLC UM mode in the transmission node (or data is received from a higher layer device), the transmission node may configure an RLC UM PDU and configure a MAC SDU and a MAC subheader. Thereafter, when the transmission node identifies or receives a transmission resource, the transmission node may determine whether to segment and transmit RLC UM PDUs according to the size of the transmission resource. In a case of a complete RLC PDU not to be segmented and transmitted, the transmission node may configure an RLC header of 1 byte not including an RLC sequence number (as indicated by reference numeral 1g-05) and maintain the VT(S) value. That is, an RLC sequence number may not be assigned. If an RLC PDU is determined to be segmented and transmitted, a header including an RLC sequence number may be configured (a header as indicated by reference numeral 1g-05 is configured). When segmentation and transmission are performed, a new RLC sequence number (new VT(S) value) is assigned to each segment, and the VT(S) value is increased by 1. That is, every time a new RLC sequence number (new VT(S) value) is assigned to each segment, the VT(S) value is increased by 1. Thereafter, when a segmentation operation is performed even for a next RLC PDU, the RLC sequence number may continuously sequentially increase and be assigned. When the VT(S) value reaches a maximum value ($2^{\char`\^}$(RLC sequence number length)−1), the VT(S) value may be reset to 0 and the above process may be repeated. When the procedure is applied to an RLC AM mode, in the AM mode, a new RLC sequence number (new VT(S) value) is assigned to complete data (RLC SDU) or each segment, and the VT(S) value may be increased by 1.

When a reception node RLC layer device operates based on a window, a reception node operates an RLC reception window, the window being the half the size of an RLC sequence number may be operated. A lower edge of the window may be configured as a sequence number obtained by subtracting the size of an RLC window from an upper edge, and the upper edge may be configured as the highest RLC sequence number received in reception node RLC.

Therefore, when a received RLC sequence number is greater than RLC sequence numbers in the window, the window moves according thereto. When the sequence number of a received RLC PDU has a value greater than that of the upper edge of the received window, the window may move forward. Meanwhile, the sequence number of a received RLC PDU has a value smaller than that of the lower edge of the received window, the reception node RLC layer may discard the RLC PDU, and check whether an overlapping RLC PDU is received with respect to RLC sequence numbers in the window, and discard same. When an RLC PDU segment having an RLC sequence number in the window has arrived, the reception node RLC layer may store same, when the lower edge of the window passes the RLC sequence number corresponding to the RLC PDU segment, perform reassembling to generate a complete RLC PDU and transmit same to a higher layer, and when generation of the complete RLC PDU fails, perform an operation of discarding RLC PDU segments. The reception node RLC layer may identify a SI field, when the SI field indicates an RLC PDU for which a segmentation operation has not been performed, immediately transmit the RLC PDU up to a higher layer, when the SI field indicates an RLC PDU obtained by a segmentation operation, store the RLC PDU, when a reassembly procedure is triggered by the window as described above (when the lower edge moves to a value greater than RLC sequence numbers of segments), perform the reassembly procedure, and transmit the reassembled RLC PDU to the higher layer, or discard the RLC PDU.

In the following description of the disclosure, an operation of a transmission RLC layer device and an operation of a reception RLC layer device when a SI field-based data segmentation method proposed above in the disclosure or a SO field-based data segmentation method is configured (or used) for an RLC UM mode (UM data transfer) may be proposed.

A transmission UM RLC layer device may perform the following operations when transmitting data (UMD PDU) to a lower layer device.

1> If use of a SI field-based data segmentation method is not configured, or if a SO field-based data segmentation method is configured to be used, 2> If the data (UMD PDU) includes a segment of an RLC SDU, 3> The RLC sequence number of the data (UMD PDU) may be configured as a UM_TX_Next variable value.

2> If the data includes a segment mapped to (or matching) the last byte of an RLC SDU, 3> The UM_TX_Next value is increased by 1.

1> Otherwise (or if a SI field-based data segmentation method is configured to be used, or if a SO field-based data segmentation method is configured not to be used), 2> If data (UMD PDU) includes a segment of an RLC SDU, the RLC sequence number of the data (UMD PDU) may be configured as a UM_TX_Next variable value. Thereafter, the UM_TX_Next value is increased by 1.

A reception UM RLC layer device may perform the following operations when storing data (UMD PDU) corresponding to RLC sequence number x in a buffer.

1> If all byte segments corresponding to RLC sequence number x are received, and(or) if a SI field-based data segmentation method is not configured, 2> An RLC SDU is reassembled using all the byte segments corresponding to RLC sequence number x, an RLC header is removed, and the reassembled RLC SDU may be transferred to a higher layer device.

1> On the other hand, if all byte segments corresponding to the data (RLC SDU or UMD PDU) are received, and(or) if a SI field-based data segmentation method is configured, 2> An RLC SDU is reassembled using all the byte segments corresponding to the data (RLC SDU or UMD PDU), an RLC header is removed, and the reassembled RLC SDU may be transferred to a higher layer device.

The UM_TX_Next variable is a variable of storing an RLC sequence number value to be assigned for data (data including a segment) to be newly generated next. The initial value of the variable is 0.

In the disclosure, an operation of a transmission RLC layer device and an operation of a reception RLC layer device when a SI field-based data segmentation method proposed above in the disclosure or a SO field-based data segmentation method is configured (or used) for an RLC AM mode (AM data transfer) may be proposed.

A transmission AM RLC layer device may perform the following operations for each RLC SDU received from a higher layer device.

1> If use of a SI field-based data segmentation method is not configured, or if a SO field-based data segmentation method is configured to be used, 2> The RLC sequence number of the RLC SDU is configured as a value equal to AM_TX_Next, and an AMD PDU configured to have an RLC sequence number equal to AM_TX_Next may be generated.

2> The AM_TX_Next value is increased by 1.

A transmission AM RLC layer device may perform the following operations when transmitting data (AMD PDU) including a segment of an RLC SDU to a lower layer device.

1> If use of a SI field-based data segmentation method is not configured, or if a SO field-based data segmentation method is configured to be used, 2> The RLC sequence number of the data (AMD PDU) may be configured as the RLC sequence number corresponding to the RLC SDU.

A transmission AM RLC layer device may perform the following operations when transmitting data (AMD PDU) to a lower layer device.

1> If a SI field-based data segmentation method is configured to be used,

2> The RLC sequence number of the data (AMD PDU) is configured as an AM_TX_Next value, and the AM_TX_Next value is increased by 1.

A reception AM RLC layer device may perform the following operations when storing data (AMD PDU) corresponding to RLC sequence number x in a buffer.

1> If all byte segments of an RLC SDU corresponding to RLC sequence number x are received, and(or) if a SI field-based data segmentation method is not configured, 2> An RLC SDU is reassembled using all the byte segments or AMD PDUs corresponding to RLC sequence number x, an RLC header is removed, and the reassembled RLC SDU may be transferred to a higher layer device.

1> On the other hand, if all byte segments corresponding to the data (RLC SDU or AMD PDU) are received, and(or) if a SI field-based data segmentation method is configured, 2> An RLC SDU is reassembled using all the byte segments corresponding to the data (RLC SDU or AMD PDU), an RLC header is removed, and the reassembled RLC SDU may be transferred to a higher layer device.

The AM_TX_Next variable is a variable of storing an RLC sequence number value to be assigned for data to be newly generated next. The initial value of the variable is 0.

In the following description of the disclosure, methods for reducing the data processing complexity of an ARQ operation performed in an RLC layer device of an AM DRB configured for a terminal may be proposed.

Another embodiment for reducing the data processing complexity of an ARQ operation performed in an RLC layer device of an AM DRB proposed in the disclosure may be proposed. For example, the disclosure may propose that, when a base station configures bearer configuration information for a terminal through an RRC message as shown in FIG. 1E, the base station may release a data segmentation function (segmentation) or configure not using the data segmentation function, by using RLC layer device configuration information. For example, an indicator is introduced in an RRC message or RLC layer device configuration information, to configure the data segmentation function to be used or not to be used. Therefore, if a data segmentation method is configured not to be used, in a case where data transmission is impossible due to lack of uplink transmission resources and thus data segmentation is required, the terminal does not perform the data segmentation method, and include and transmit a padding instead of transmitting the data. If a data segmentation function is configured not to be used, an RLC layer device having various RLC header types according to a data segmentation procedure uses only one type of RLC header. Therefore, the terminal may increase a data processing speed because a header of each layer device has a fixed size in a PDCP layer device, an RLC layer device, or a MAC layer device. For example, in a case where a hardware accelerator having a high efficiency according to a repetitive procedure and the same size or operation being repeated is applied to data processing, if a header having a fixed size is used in an SDAP, PDCP, RLC, or MAC layer device as described above, the efficiency of the data processing may be increased and a data processing speed may be reduced. In addition, if a data segmentation function is configured not to be used in an RLC layer device as described above, an RLC state report configuring method may be simplified to be based on a bitmap, and thus the complexity of an ARQ operation may be lowered. For example, when an RLC state report is configured, there is no need to consider data segments (that is, there is no need to consider a segment offset (SO) field or a segmentation information (SI) field), and considering only an RLC sequence number field based on a bitmap is required, and thus an ARQ operation may be simple.

When a SI field-based data segmentation method proposed above in the disclosure is configured (or used) or a data segmentation function is configured not to be used, for efficient RLC state report processing, a new bitmap-based RLC state report may be configured as follows.

In the disclosure, an RX_Next variable is a variable indicating a value obtained by adding 1 to an RLC sequence number corresponding to the last RLC SDU having been completely received in sequence, or indicating a next RLC sequence number value for the RLC sequence number, and RX_Highest_Status may indicate the highest RLC sequence number value which is indicable by an ACK_SN value in an RLC state report.

A first configuration method is as follows.

An ACK_SN value of an RLC state report may be configured as the RLC sequence number of a next RLC SDU which is not indicated as having been lost in the RLC state report, or has not been received yet. As another method, an ACK_SN value may be configured as the RLC sequence number value of RX_Highest_Status. As another method, an ACK_SN value may be configured as the sequence number of the first lost RLC SDU, the RLC sequence number of the first data having not been transferred to a higher layer device, a value obtained by adding 1 to the RLC sequence number of data having been lastly transferred to the higher layer device, or the RLC sequence number value of RX_Highest_Status.

With respect to RLC SDUs having the size of an RLC sequence number equal to or greater than RX_NEXT or smaller than RX_Highest_Status, The length of a bitmap field may be configured as a length corresponding to a multiple of 8 including the RLC sequence number of the last out-of-order data from an RLC sequence number not including the first lost RLC SDU, or the length of a bitmap field may be configured as a length up to the RLC sequence number of an RLC SDU allowing the size of RLC control data (RLC state report) to match the size of a transmission resource (a transmission resource indicated by a lower layer device), from an RLC sequence number not including the first lost RLC SDU. Furthermore, the length may be configured according to one case that is satisfied early among the two cases.

When RLC SDUs corresponding to the bitmap field have not been successfully received, the bitmap field corresponding to the RLC SDUs may be configured as 0.

When RLC SDUs corresponding to the bitmap field have been successfully received, the bitmap field corresponding to the RLC SDUs may be configured as 1.

When an RLC state report configured as described above is transmitted to a lower layer device, the RLC state report may be transmitted to the lower layer device as the first RLC PDU of a transmission RLC layer device. That is, the highest priority is assigned to the RLC state report, and when the RLC state report is generated, the RLC state report is transferred first to the lower layer device, thereby being transmitted quickly.

A second configuration method is as follows.

With respect to RLC SDUs having the size of an RLC sequence number equal to or greater than RX_NEXT or smaller than RX_Highest_Status, an RLC state report may be configured as follows to be started from an RLC sequence number value equal to RX_Next in ascending order of RLC sequence numbers and to be suitable for a transmission resource indicated by a lower layer device.

Respective RLC sequence numbers starting from an RLC sequence number value equal to RX_Next and bit values of a bitmap may be mapped in one-to-one correspondence with each other in ascending order of the RLC sequence numbers and from the least significant bit (LSB or the right side) or the most significant bit (MSB or the left side).

When RLC SDUs corresponding to the bitmap field have not been successfully received, the bitmap field corresponding to the RLC SDUs may be configured as 0 (or 1).

When RLC SDUs corresponding to the bitmap field have been successfully received, the bitmap field corresponding to the RLC SDUs may be configured as 1 (or 0).

An ACK_SN value of an RLC state report may be configured as the RLC sequence number of a next RLC SDU which is not indicated as having been lost in the RLC state report, or has not been received yet. As another method, an ACK_SN value may be configured as the RLC sequence number value of RX_Highest_

Status. As another method, an ACK_SN value may be configured as the sequence number of the first lost RLC SDU, the RLC sequence number of the first data having not been transferred to a higher layer device, a value obtained by adding 1 to the RLC sequence number of data having been lastly transferred to the higher layer device, or the RLC sequence number value of RX_Highest_Status.

The length of a bitmap field may be configured as a length corresponding to a multiple of 8 including the RLC sequence number of the last out-of-order data from an RLC sequence number not including the first lost RLC SDU, or the length of a bitmap field may be configured as a length up to the RLC sequence number of an RLC SDU allowing the size of RLC control data (RLC state report) to match the size of a transmission resource, from an RLC sequence number not including the first lost RLC SDU. Furthermore, the length may be configured according to one case that is satisfied early among the two cases.

When an RLC state report configured as described above is transmitted to a lower layer device, the RLC state report may be transmitted to the lower layer device as the first RLC PDU of a transmission RLC layer device. That is, the highest priority is assigned to the RLC state report, and when the RLC state report is generated, the RLC state report is transferred first to the lower layer device, thereby being transmitted quickly.

A third configuration method is as follows.

With respect to RLC SDUs having the size of an RLC sequence number equal to or greater than RX_NEXT or smaller than RX_Highest_Status, an RLC state report may be configured as follows to be started from an RLC sequence number value equal to RX_Next in ascending order of RLC sequence numbers and to be suitable for a transmission resource indicated by a lower layer device.

The length of a bitmap field may be assigned to be as long as or equal to the number of RLC sequence numbers included in an RLC state report which is configured to be started from an RLC sequence number value equal to RX_Next and to be suitable for the size of the entire uplink transmission resource indicated by a lower layer device. Respective RLC sequence numbers of data of an RLC layer device and bit values of a bitmap may be mapped in one-to-one correspondence with each other in ascending order (or descending order) of the RLC sequence numbers and from the least significant bit (LSB or the right side) or the most significant bit (MSB or the left side).

When RLC sequence numbers or RLC SDUs (or RLC SDU segments) corresponding to the bitmap field have not been successfully received, the bitmap field corresponding to the RLC SDUs may be configured as 0 (or 1).

When RLC sequence numbers or RLC SDUs (or RLC SDU segments) corresponding to the bitmap field have been successfully received, the bitmap field corresponding to the RLC SDUs may be configured as 1 (or 0).

An ACK_SN value of an RLC state report may be configured as the RLC sequence number of a next RLC SDU which is not indicated as having been lost in the RLC state report, or has not been received yet. As another method, an ACK_SN value may be configured as the RLC sequence number value of RX_Highest_Status. As another method, an ACK_SN value may be configured as the sequence number of the first lost RLC SDU, the RLC sequence number of the first data having not been transferred to a higher layer device, a value obtained by adding 1 to the RLC sequence number of data having been lastly transferred to the higher layer device, or the RLC sequence number value of RX_Highest_Status.

As another method, the length of a bitmap field may be configured as a length corresponding to a multiple of 8 including the RLC sequence number of the last out-of-order data from an RLC sequence number not including the first lost RLC SDU, or the length of a bitmap field may be configured as a length up to the RLC sequence number of an RLC SDU allowing the size of RLC control data (RLC state report) to match the size of a transmission resource, from an RLC sequence number not including the first lost RLC SDU. Furthermore, the length may be configured according to one case that is satisfied early among the two cases.

When an RLC state report configured as described above is transmitted to a lower layer device, the RLC state report may be transmitted to the lower layer device as the first RLC PDU of a transmission RLC layer device. That is, the highest priority is assigned to the RLC state report, and when the RLC state report is generated, the RLC state report is transferred first to the lower layer device, thereby being transmitted quickly.

A bitmap-based RLC state report proposed in the disclosure as described above may be defined by a new RLC control data (RLC control PDU). For example, a control PDU type identifier (control PDU type field) or a CPT field value (e.g., 3 bits) is defined in an RLC header, and thus may provide indication enabling distinguishment between an RLC state report using ACK_SN, NACK_SN, NACK_RANGE, or SO fields and a bitmap-based RLC state report proposed in the disclosure. As another method, a new indicator (e.g., a 1-bit indicator) is introduced in an RLC header, and thus may provide indication enabling distinguishment between an RLC state report using ACK_SN, NACK_SN, NACK_RANGE, or SO fields and a bitmap-based RLC state report proposed in the disclosure.

As an embodiment for reducing the complexity of data processing performed by a terminal in the disclosure, another embodiment may be proposed. In the above embodiment, when bearer configuration information is configured for a terminal through an RRC message as illustrated in FIG. 1E, a base station may use MAC, RLC, or PDCP layer device configuration information to configure the terminal to use one MAC, RLC, or PDCP header format or to use a new MAC, RLC, or PDCP header format, or indicate, for the terminal, a data segmentation method (or the type of a data segmentation method, a SO field-based method (FIG. 1I), or a SI field-based method (FIG. 1M)) or a new function (as another method, even without configuration information, the terminal may use a method proposed in the embodiment). For example, an indicator is introduced in an RRC message or MAC, RLC, or PDCP layer device configuration information, to configure the embodiment to be used or not to be used.

In the embodiment, a method enabling use of only one type of a MAC, RLC, or PDCP header in a MAC, RLC, or PDCP layer device having various MAC, RLC, or PDCP header types may be proposed. Therefore, the terminal may increase a data processing speed because a header of each layer device has a fixed size in a PDCP layer device, an RLC layer device, or a MAC layer device. For example, in a case where a hardware accelerator having a high efficiency according to a repetitive procedure and the same size or operation being repeated is applied to data processing, if a header having a fixed size is used in an SDAP, PDCP, RLC, or MAC layer device as described above, the efficiency of the data processing may be increased and a data processing speed may be reduced.

FIG. 1QB and FIG. 1QB are diagrams illustrating an operation of an RLC layer device of a terminal according to an embodiment of the disclosure.

If a transmission RLC layer device 1q-01 is a transmission UM RLC layer device (operation 1q-02), the device may perform the following operations when transmitting data (UMD PDU) to a lower layer device.

1> If use of a SI field-based data segmentation method is not configured, or if a SO field-based data segmentation method is configured to be used (operation 1q-03), the following procedure may be performed (operation 1q-04).

2> If the data (UMD PDU) includes a segment of an RLC SDU,

3> The RLC sequence number of the data (UMD PDU) may be configured as a UM_TX_Next variable value.

2> If the data includes a segment mapped to (or matching) the last byte of an RLC SDU, 3> The UM_TX_Next value is increased by 1.

1> Otherwise (or if a SI field-based data segmentation method is configured to be used, or if a SO field-based data segmentation method is configured not to be used (operation 1q-03), the following procedure may be performed (operation 1q-05).

2> If data (UMD PDU) includes a segment of an RLC SDU, the RLC sequence number of the data (UMD PDU) may be configured as a UM_TX_Next variable value. Thereafter, the UM_TX_Next value is increased by 1.

If the transmission RLC layer device 1q-01 is a transmission AM RLC layer device (operation 1q-02), the device may perform the following operations when transmitting data (UMD PDU) to a lower layer device.

1> If use of a SI field-based data segmentation method is not configured, or if a SO field-based data segmentation method is configured to be used (operation 1q-06), the following procedure may be performed (operation 1q-07).

2> The transmission AM RLC layer device may perform the following operations for each RLC SDU received from a higher layer device.

3> The RLC sequence number of the RLC SDU is configured as a value equal to AM_TX_Next, and an AMD PDU configured to have an RLC sequence number equal to AM_TX_Next may be generated.

3> The AM_TX_Next value is increased by 1.

2> The transmission AM RLC layer device may perform the following operations when transmitting data (AMD PDU) including a segment of an RLC SDU to a lower layer device.

3> The RLC sequence number of the data (AMD PDU) may be configured as the RLC sequence number corresponding to the RLC SDU.

1> Otherwise, if a SI field-based data segmentation method is configured to be used (operation 1q-06), the following procedure may be performed (operation 1q-08).

2> The transmission AM RLC layer device may perform the following operations when transmitting data (AMD PDU) to a lower layer device.

3> The RLC sequence number of the data (AMD PDU) is configured as an AM_TX_Next value, and the AM_TX_Next value is increased by 1.

If a reception RLC layer device 1q-11 is a reception UM RLC layer device (operation 1q-12), the device may perform the following operations when receiving data (UMD PDU).

The reception UM RLC layer device may perform the following operations when storing data (UMD PDU) corresponding to RLC sequence number x in a buffer.

1> If all byte segments corresponding to RLC sequence number x are received, and(or) if a SI field-based data segmentation method is not configured (operation 1q-13), the following procedure may be performed (operation 1q-14).

2> An RLC SDU is reassembled using all the byte segments corresponding to RLC sequence number x, an RLC header is removed, and the reassembled RLC SDU may be transferred to a higher layer device.

1> On the other hand, if all byte segments corresponding to the data (RLC SDU or UMD PDU) are received, and(or) if a SI field-based data segmentation method is configured (1q-13), the following procedure may be performed (operation 1q-15).

2> An RLC SDU is reassembled using all the byte segments corresponding to the data (RLC SDU or UMD PDU), an RLC header is removed, and the reassembled RLC SDU may be transferred to a higher layer device.

If the reception RLC layer device 1q-11 is a reception AM RLC layer device (operation 1q-12), the device may perform the following operations when receiving data (UMD PDU).

The reception AM RLC layer device may perform the following operations when storing data (AMD PDU) corresponding to RLC sequence number x in a buffer.

1> If all byte segments of an RLC SDU corresponding to RLC sequence number x are received, and(or) if a SI field-based data segmentation method is not configured (operation 1q-16), the following procedure may be performed (operation 1q-17).

2> An RLC SDU is reassembled using all the byte segments or AMD PDUs corresponding to RLC sequence number x, an RLC header is removed, and the reassembled RLC SDU may be transferred to a higher layer device.

1> On the other hand, if all byte segments corresponding to the data (RLC SDU or AMD PDU) are received, and(or) if a SI field-based data segmentation method is configured (1q-12), the following procedure may be performed (operation 1q-18).

2> An RLC SDU is reassembled using all the byte segments corresponding to the data (RLC SDU or AMD PDU), an RLC header is removed, and the reassembled RLC SDU may be transferred to a higher layer device.

Figure 1R:
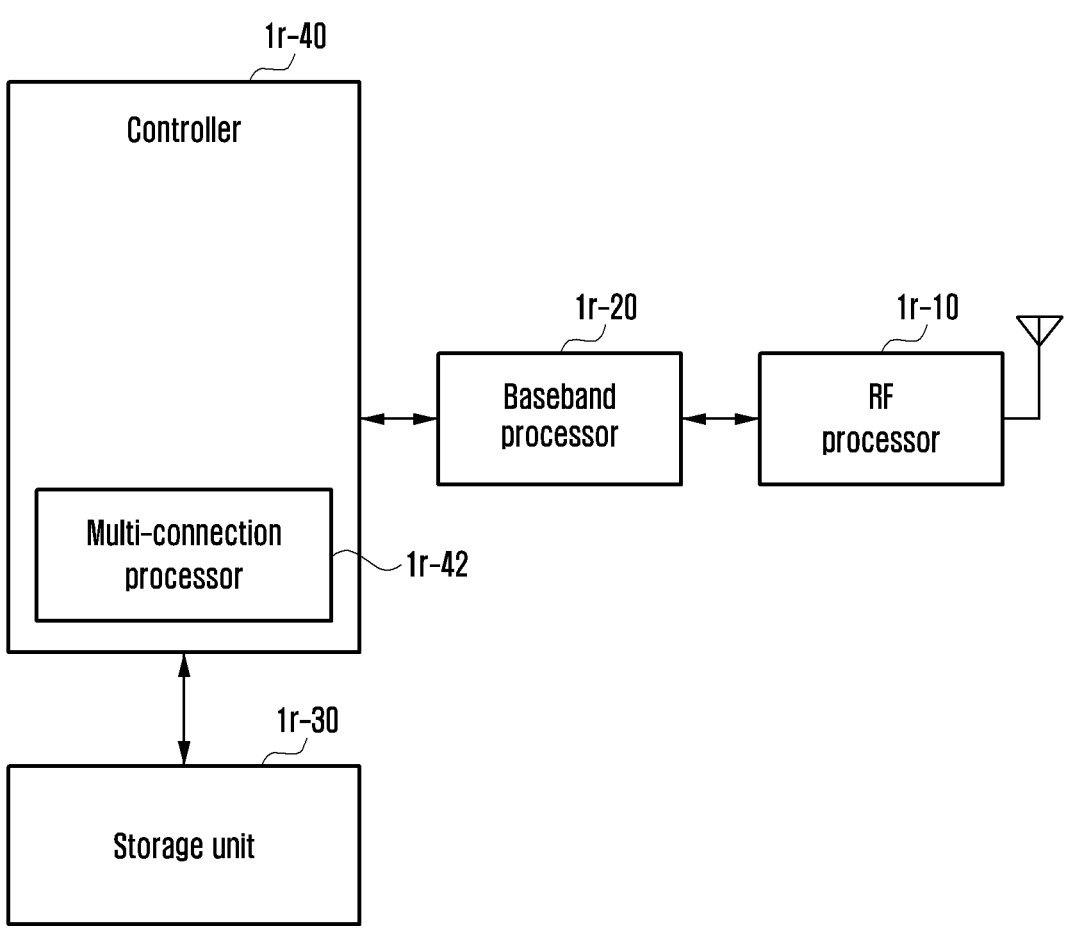
FIG. 1R is a diagram illustrating a structure of a terminal to which an embodiment of the disclosure is applicable.

FIG. 1R is a diagram illustrating a structure of a terminal to which an embodiment of the disclosure is applicable.

Referring to FIG. 1R, the terminal may include a radio frequency (RF) processor 1r-10, a baseband processor 1r-20, a storage unit 1r-30, and a controller 1r-40.

The RF processor 1r-10 may perform a function, such as signal band change, amplification, etc., for transmitting or receiving a signal through a wireless channel. That is, the RF processor 1r-10 may upconvert a baseband signal provided from the baseband processor 1r-20, into an RF band signal, and then transmit the RF band signal through an antenna, and may downconvert an RF band signal received through the antenna, into a baseband signal. For example, the RF processor 1r-10 may include a transmission filter, a reception filter, an amplifier, a mixer, an oscillator, a digital-to-analog converter (DAC), an analog-to-digital converter (ADC), and the like. In the diagram, only one antenna is illustrated, but the terminal may include a plurality of antennas. In addition, the RF processor 1r-10 may include a plurality of RF chains. Furthermore, the RF processor 1r-10 may perform beamforming. To perform the beamforming, the RF processor 1r-10 may adjust the phase and size of each of signals transmitted or received through a plurality of antennas or antenna elements. In addition, the RF processor may perform MIMO, and may receive several layers when a MIMO operation is performed. The RF processor 1r-10 may properly configure a plurality of antennas or antenna elements according to a control of the controller to perform reception beam sweeping or adjust the direction and the beam width of a reception beam to be coordinate with a transmission beam.

The baseband processor 1r-20 may perform a function of conversion between a baseband signal and a bitstream according to physical layer specifications of a system. For example, when data is transmitted, the baseband processor 1r-20 may generate complex symbols by encoding and modulating a transmission bitstream. In addition, when data is received, the baseband processor 1r-20 reconstructs a reception bit stream by demodulating and decoding a baseband signal provided from the RF processor 1r-10. For example, in a case where an orthogonal frequency division multiplexing (OFDM) scheme is applied, when data is transmitted, the baseband processor 1r-20 may generate complex symbols by encoding and modulating a transmission bitstream, map the complex symbols to subcarriers, and then configure OFDM symbols through inverse fast Fourier transform (IFFT) calculation and cyclic prefix (CP) insertion. In addition, when data is received, the baseband processor 1r-20 may divide a baseband signal provided from the RF processor 1r-10, by the units of OFDM symbols, reconstruct signals mapped to subcarriers, through fast Fourier transform (FFT) calculation, and then reconstruct a reception bit stream through demodulation and decoding.

The baseband processor 1r-20 and the RF processor 1r-10 may transmit and receive a signal as described above. Accordingly, the baseband processor 1r-20 and the RF processor 1r-10 may be called a transmitter, a receiver, a transceiver, or a communication unit. Furthermore, at least one of the baseband processor 1r-20 and the RF processor 1r-10 may include a plurality of communication modules to support a plurality of different wireless access technologies. In addition, at least one of the baseband processor 1r-20 and the RF processor 1r-10 may include different communication modules to process signals in different frequency bands. For example, different wireless access technologies may include LTE network, NR network, etc. In addition, the different frequency bands may include a super high frequency (SHF) (e.g., 2.5 GHz and 5 GHz) band, and a millimeter (mm) wave (e.g., 60 GHz) band.

The storage unit 1r-30 may store data such as a basic program, an application program, and configuration information for an operation of the terminal. The storage unit 1r-30 may provide stored data in response to a request of the controller 1r-40.

The controller 1r-40 may control overall operations of the terminal. For example, the controller 1r-40 may transmit or receive a signal via the baseband processor 1r-20 and the RF processor 1r-10. In addition, the controller 1r-40 records and reads data in and from the storage unit 1r-40. To this end, the controller 1r-40 may include at least one processor. For example, the controller 1r-40 may include a communication processor (CP) performing a control for communication, and an application processor (AP) controlling a higher layer, such as an application program.

Figure 1S:
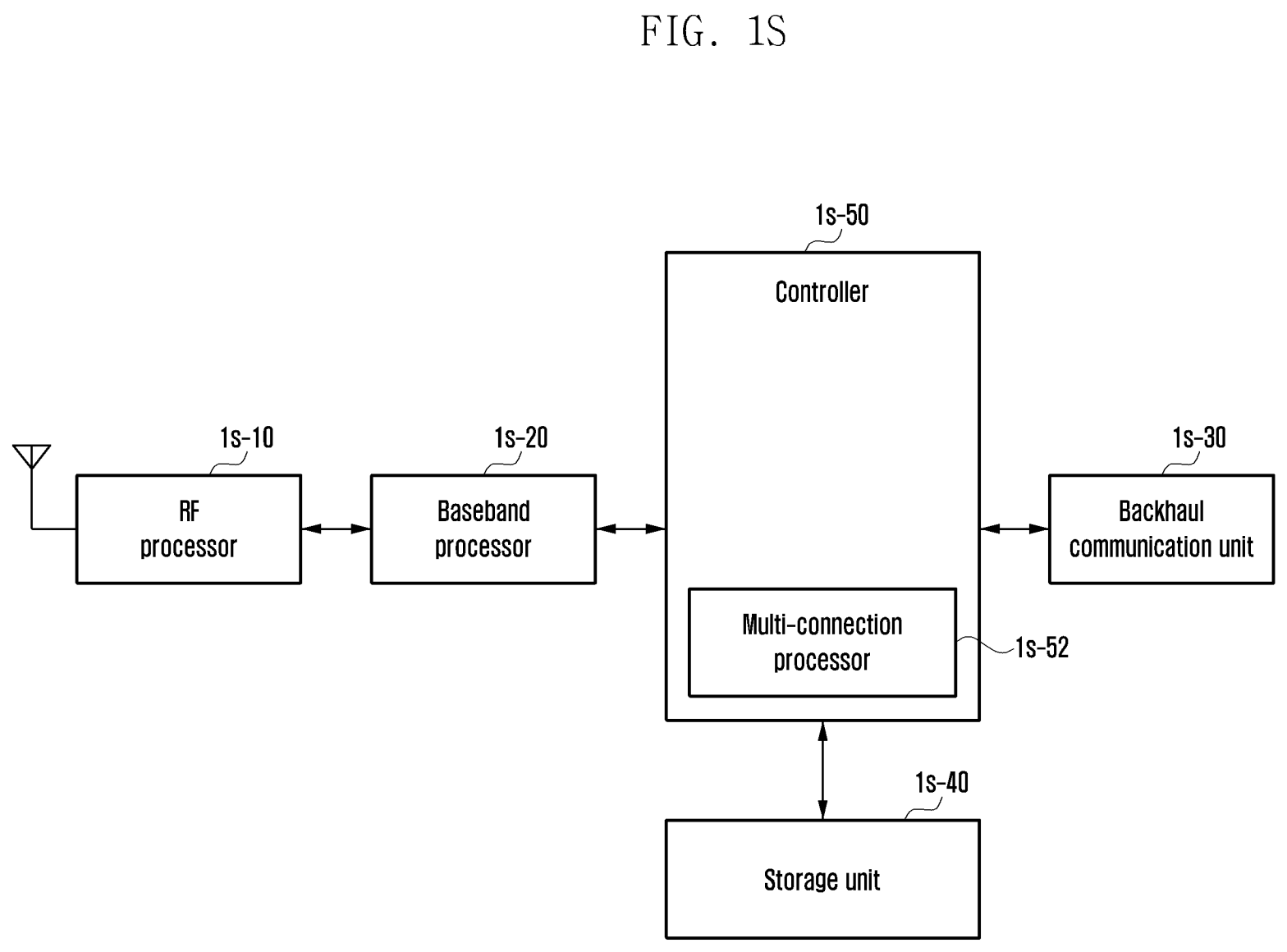

FIG. 1S is a diagram illustrating a block configuration of a base station in a wireless communication system to which an embodiment of the disclosure is applicable.

As illustrated in FIG. 1S, the base station includes an RF processor 1s-10, a baseband processor 1s-20, a backhaul communication unit 1s-30, a storage unit 1s-40, and a controller 1s-50.

The RF processor 1s-10 may perform a function, such as signal band change, amplification, etc., for transmitting or receiving a signal through a wireless channel. That is, the RF processor 1s-10 may upconvert a baseband signal provided from the baseband processor 1s-20, into an RF band signal, and then transmit the RF band signal through an antenna, and may downconvert an RF band signal received through the antenna, into a baseband signal. For example, the RF processor 1s-10 may include a transmission filter, a reception filter, an amplifier, a mixer, an oscillator, a DAC, an ADC, and the like. In the diagram, only one antenna is illustrated, but the first access node may include a plurality of antennas. In addition, the RF processor 1s-10 may include a plurality of RF chains. Furthermore, the RF processor 1s-10 may perform beamforming. To perform the beamforming, the RF processor 1s-10 may adjust the phase and size of each of signals transmitted or received through a plurality of antennas or antenna elements. The RF processor may perform a downlink MIMO operation by transmitting one or more layers.

The baseband processor 1s-20 performs a function of conversion between a baseband signal and a bit stream according to a physical layer standard of a first wireless access technique. For example, when data is transmitted, the baseband processor 1s-20 may generate complex symbols by encoding and modulating a transmission bitstream. In addition, when data is received, the baseband processor 1s-20 reconstructs a reception bit stream by demodulating and decoding a baseband signal provided from the RF processor 1s-10. For example, in a case where an OFDM scheme is applied, when data is transmitted, the baseband processor 1s-20 may generate complex symbols by encoding and modulating a transmission bitstream, map the complex symbols to subcarriers, and then configure OFDM symbols through IFFT calculation and CP insertion. In addition, when data is received, the baseband processor 1s-20 may divide a baseband signal provided from the RF processor 1s-10, by the units of OFDM symbols, reconstruct signals mapped to subcarriers, through FFT, and then reconstruct a reception bit stream through demodulation and decoding. The baseband processor 1s-20 and the RF processor 1s-10 may transmit and receive a signal as described above. Accordingly, the baseband processor 1s-20 and the RF processor 1s-10 may be called a transmitter, a receiver, a transceiver, a communication unit, or a wireless communication unit.

The communication unit 1s-30 may provide an interface for performing communication with other nodes within a network.

The storage unit 1s-40 may store data such as a basic program, an application program, and configuration information for an operation of the base station. Particularly, the storage unit 1s-40 may store information relating to a bearer assigned to a connected terminal, a measurement result reported from a connected terminal, etc. In addition, the storage unit 1s-40 may store information serving as a determination criterion of whether to provide or stop providing multi-connection to a terminal. The storage unit 1s-40 may provide stored data in response to a request of the controller 1s-50.

The controller 1s-50 may control overall operations of the base station. For example, the controller 1s-50 may transmit or receive a signal via the baseband processor 1s-20 and the RF processor 1s-10, or via the backhaul communication unit 1s-30. In addition, the controller 1s-50 records and reads data in and from the storage unit 1s-40. To this end, the controller 1s-50 may include at least one processor.

The invention claimed is:

1. A method performed by a transmission device of a wireless communication system, the method comprising:
    receiving a configuration information including information associated with segmentation;
    segmenting a radio link control (RLC) service data unit (SDU) into at least two segments of the RLC SDU;
    identifying whether the information associated with segmentation is configured for Acknowledged Mode (AM) RLC layer;
    generating a RLC header corresponding to a RLC SDU segment based on the information associated with segmentation for the AM RLC layer, wherein the RLC header includes a segmentation information (SI) field and a sequence number (SN) of the RLC SDU segment; and
    generating AM data (AMD) protocol data unit (PDU) including the RLC header and the RLC SDU segment,
    wherein the SI field indicates whether the AMD PDU contains first, middle, or last segment of the RLC SDU and the SN of the RLC SDU segment indicates an order of the RLC SDU segment.

2. The method of claim 1,
    wherein the SI field further indicates whether the RLC SDU has not been segmented, and
    wherein the SN has a sequence number in ascending order according to a sequence of the at least two segments of the RLC SDU.

3. The method of claim 1, further comprising:
    in case that the information associated with segmentation is not configured, generating a RLC header corresponding to a RLC SDU segment,
    wherein the RLC header includes an SI field and a SN of the RLC SDU segment,
    wherein the SI field indicates whether the AMD PDU contains first, middle, or last segment of the RLC SDU,
    wherein a sequence number in the SN is same for the at least two segments of the RLC SDU, and
    wherein a RLC header corresponding to a RLC SDU segment which is not a first segment of the RLC SDU further comprises a segment offset (SO) field indicating a position of the RLC SDU segment within the RLC SDU.

4. A method performed by a reception device of a wireless communication system, the method comprising:
    transmitting, to a transmission device, a configuration information including information associated with segmentation;
    receiving, from the transmission device, an Acknowledged Mode (AM) data (AMD) protocol data unit (PDU) including a radio link control (RLC) header and an RLC service data unit (SDU) segment;
    in case that the information associated with segmentation is configured for AM RLC layer, identifying the RLC header corresponding to the RLC SDU segment based on the information associated with segmentation for the AM RLC layer, wherein the RLC header includes a segmentation information (SI) field and a sequence number (SN) of the RLC SDU segment;

identifying at least two segments of an RLC SDU based on the SI field and the SN of the at least two segments;
    reassembling the at least two segments to the RLC SDU according to orders; and
    transmitting the reassembled RLC SDU to a higher layer,
    wherein the SI field indicates whether the AMD PDU contains first, middle, or last segment of the RLC SDU and the SN of the RLC SDU segment indicates an order of the RLC SDU segment.

5. The method of claim 4,
    wherein the SI field further indicates whether the RLC SDU has not been segmented, and
    wherein the SN has a sequence number in ascending order according to a sequence of the at least two segments of the RLC SDU.

6. The method of claim 4,
    wherein in case that the information associated with segmentation is not configured, a RLC header includes an SI field and a SN of the RLC SDU segment,
    wherein the SI field indicates whether the AMD PDU contains first, middle, or last segment of the RLC SDU,
    wherein a sequence number in the SN is same for the at least two segments of the RLC SDU, and
    wherein a RLC header corresponding to a RLC SDU segment which is not a first segment of the RLC SDU further comprises a segment offset (SO) field indicating a position of the RLC SDU segment within the RLC SDU.

7. A transmission device of a wireless communication system, the transmission device comprising:
    a transceiver; and
    a controller coupled with the transceiver and configured to:
        receive a configuration information including information associated with segmentation,
        segment a radio link control (RLC) service data unit (SDU) into at least two segments of the RLC SDU,
        identify whether the information associated with segmentation is configured for Acknowledged Mode (AM) RLC layer,
        generate a RLC header corresponding to a RLC SDU segment based on the information associated with segmentation for the AM RLC layer, wherein the RLC header includes a segmentation information (SI) field and a sequence number (SN) of the RLC SDU segment, and
        generate AM data (AMD) protocol data unit (PDU) including the RLC header and the RLC SDU segment,
    wherein the SI field indicates whether the AMD PDU contains first, middle, or last segment of the RLC SDU and the SN of the RLC SDU segment indicates an order of the RLC SDU segment.

8. The transmission device of claim 7,
    wherein the SI field further indicates whether the RLC SDU has not been segmented, and
    wherein the SN has a sequence number in ascending order according to a sequence of the at least two segments of the RLC SDU.

9. The transmission device of claim 7, wherein the controller is configured to:
    in case that the information associated with segmentation is not configured, generate a RLC header corresponding to a RLC SDU segment,
    wherein the RLC header includes an SI field and a SN of the RLC SDU segment, wherein the SI field indicates whether the AMD PDU contains first, middle, or last segment of the RLC SDU, wherein a sequence number in the SN is same for the at least two segments of the RLC SDU, and wherein a RLC header corresponding to a RLC SDU segment which is not a first segment of the RLC SDU further comprises a segment offset (SO) field indicating a position of the RLC SDU segment within the RLC SDU.

10. A reception device of a wireless communication system, the reception device comprising:

a transceiver; and a controller coupled with the transceiver and configured to:

transmit, to a transmission device, a configuration information including information associated with segmentation, receive, from the transmission device, an Acknowledged Mode (AM) data (AMD) protocol data unit (PDU) including a radio link control (RLC) header and an RLC service data unit (SDU) segment, in case that the information associated with segmentation is configured for AM RLC layer, identify the RLC header corresponding to the RLC SDU segment based on the information associated with segmentation for the AM RLC layer, wherein the RLC header includes a segmentation information (SI) field and a sequence number (SN) of the RLC SDU segment, identify at least two segments of an RLC SDU based on the SI field and the SN of the at least two segments, reassemble the at least two segments to the RLC SDU according to orders, and transmit the reassembled RLC SDU to a higher layer, wherein the SI field indicates whether the AMD PDU contains first, middle, or last segment of the RLC SDU and the SN of the RLC SDU segment indicates an order of the RLC SDU segment.

11. The reception device of claim 10, wherein the SI field further indicates whether the RLC SDU has not been segmented, and wherein the SN has a sequence number in ascending order according to a sequence of the at least two segments of the RLC SDU.

12. The reception device of claim 10, wherein, in case that the information associated with segmentation is not configured, a RLC least header includes an SI field and a SN of the RLC SDU segment, wherein the SI field indicates whether the AMD PDU contains first, middle, or last segment of the RLC SDU, wherein a sequence number in the SI is same for the at least two segments of the RLC SDU, and wherein a RLC header corresponding to a s RLC SDU segment which is not a first segment of the RLC SDU further comprises a segment offset, SO, field indicating a position of the RLC SDU segment within the RLC SDU.

* * * * *